(12) United States Patent
Audebert et al.

(10) Patent No.: US 10,879,503 B2
(45) Date of Patent: *Dec. 29, 2020

(54) METHODS FOR THE MANUFACTURE OF FLEXIBLE MICROBATTERIES

(71) Applicant: Johnson & Johnson Vision Care, Inc., Jacksonville, FL (US)

(72) Inventors: Jean-Francois Audebert, Falls Church, VA (US); Zachary Kanner, Framingham, MA (US); Leonard Pagliaro, Bowie, MD (US); Lawrence Edward Weinstein, Silver Spring, MD (US); Serena Peterson, College Park, MD (US); Jonathan Howarth, Baltimore, MD (US)

(73) Assignee: JOHNSON & JOHNSON VISION CARE, INC., Jacksonville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/882,126

(22) Filed: Jan. 29, 2018

(65) Prior Publication Data

US 2018/0159094 A1 Jun. 7, 2018
US 2020/0280026 A9 Sep. 3, 2020

Related U.S. Application Data

(63) Continuation-in-part of application No. 15/326,161, filed as application No. PCT/US2015/041365 on Jul. 21, 2015, now Pat. No. 10,593,911.

(60) Provisional application No. 62/487,262, filed on Apr. 19, 2017, provisional application No. 62/026,851, filed on Jul. 21, 2014.

(51) Int. Cl.
| | | |
|---|---|---|
| *H01M 2/02* | (2006.01) | |
| *H01M 4/66* | (2006.01) | |
| *H01M 6/40* | (2006.01) | |
| *H01M 10/04* | (2006.01) | |

(52) U.S. Cl.
CPC ....... *H01M 2/0275* (2013.01); *H01M 2/0207* (2013.01); *H01M 4/661* (2013.01); *H01M 6/40* (2013.01); *H01M 10/0436* (2013.01); *H01M 2220/30* (2013.01)

(58) Field of Classification Search
CPC .. H01M 2/0207; H01M 2/0275; H01M 4/661; H01M 6/40; H01M 10/0436; H01M 2220/30
See application file for complete search history.

(56) References Cited

U.S. PATENT DOCUMENTS

| 3,690,325 A | 9/1972 | Kenny |
| 2004/0029005 A1 | 2/2004 | Leising et al. |
| 2006/0159990 A1 | 7/2006 | Ryu et al. |

(Continued)

FOREIGN PATENT DOCUMENTS

| CA | 2843727 A1 | 2/2013 |
| CN | 102881944 A | 1/2013 |

(Continued)

*Primary Examiner* — Gary D Harris

(57) ABSTRACT

Designs, strategies and methods for forming micro-batteries are described. In some examples, ultrasonic welded seals may be used to seal battery chemistry within the micro-battery. In some further examples, the micro-battery is encapsulated by a copper film where at least a portion of the copper film is formed by electroless plating.

2 Claims, 15 Drawing Sheets

(56) References Cited

U.S. PATENT DOCUMENTS

| | | |
|---|---|---|
| 2007/0212597 A1 | 9/2007 | Herlinger |
| 2008/0254348 A1 | 10/2008 | Hatta et al. |
| 2011/0311857 A1 | 12/2011 | Tucholski |
| 2012/0107666 A1 | 5/2012 | Bailey |
| 2013/0019552 A1 | 1/2013 | Murdock et al. |
| 2013/0029205 A1 | 1/2013 | Adams |
| 2013/0034753 A1* | 2/2013 | Tsukuda ............ H01M 2/1016 429/7 |
| 2013/0130087 A1 | 5/2013 | Kawaguchi et al. |
| 2013/0195523 A1 | 8/2013 | Yamaji et al. |
| 2013/0260214 A1 | 10/2013 | Ueda |
| 2015/0086871 A1* | 3/2015 | Cao ................ H01M 4/0428 429/220 |
| 2016/0020481 A1 | 1/2016 | He et al. |
| 2016/0054593 A1 | 2/2016 | Flitsch et al. |
| 2016/0056417 A1* | 2/2016 | Flitsch ............ B29D 11/00817 429/185 |
| 2016/0248053 A1 | 8/2016 | Iseri et al. |
| 2016/0365584 A1* | 12/2016 | Etzkorn ............ H01M 2/0202 |

FOREIGN PATENT DOCUMENTS

| | | |
|---|---|---|
| CN | 203636362 U | 6/2014 |
| CN | 103915645 A | 7/2014 |
| CN | 103915646 A | 7/2014 |
| CN | 105406086 A | 3/2016 |
| EP | 1156541 A2 | 11/2001 |
| EP | 1156541 A3 | 3/2003 |
| EP | 1156541 B1 | 1/2013 |
| EP | 2996683 A2 | 4/2018 |
| JP | 2011-214074 A | 10/2011 |
| KR | 2016031639 A | 3/2016 |
| RU | 2364988 C1 | 8/2009 |
| WO | WO2006028347 A1 | 3/2006 |
| WO | WO2006028347 B1 | 6/2006 |
| WO | WO2010033683 A1 | 3/2010 |
| WO | WO 2011093806 A3 | 8/2011 |
| WO | WO2011093806 A3 | 8/2011 |
| WO | WO2013/019525 A1 | 7/2013 |
| WO | WO 2013/019525 A1 | 7/2013 |
| WO | WO2016/014554 A1 | 1/2016 |

* cited by examiner

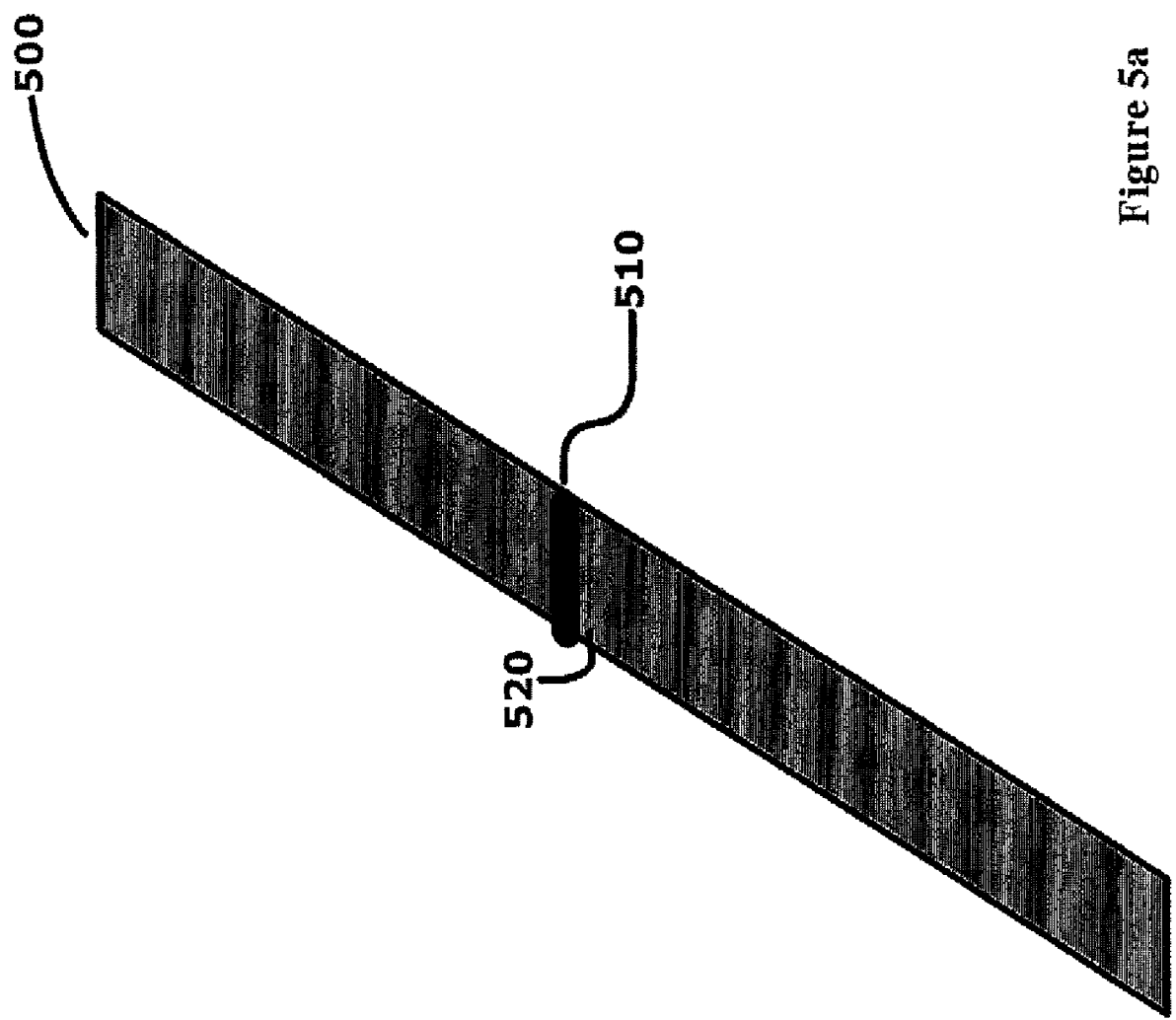

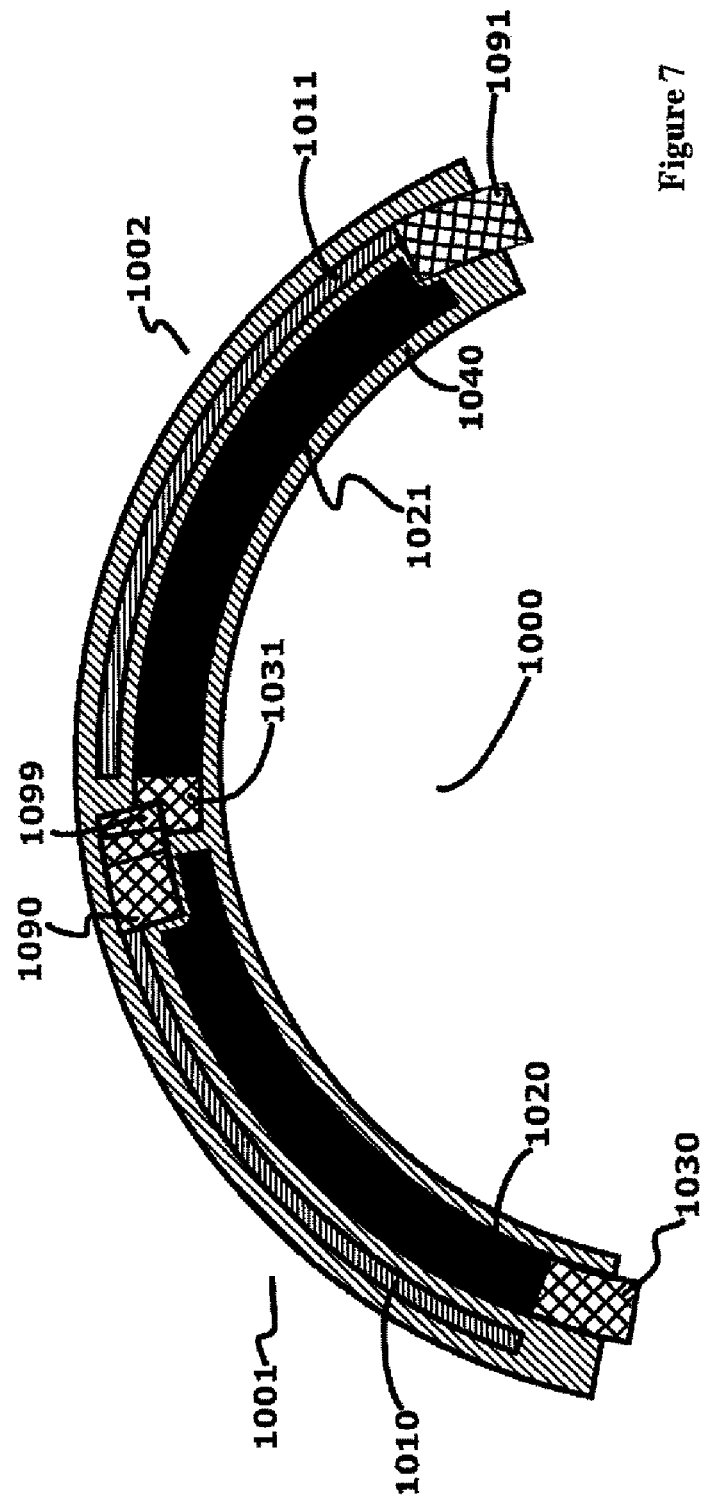

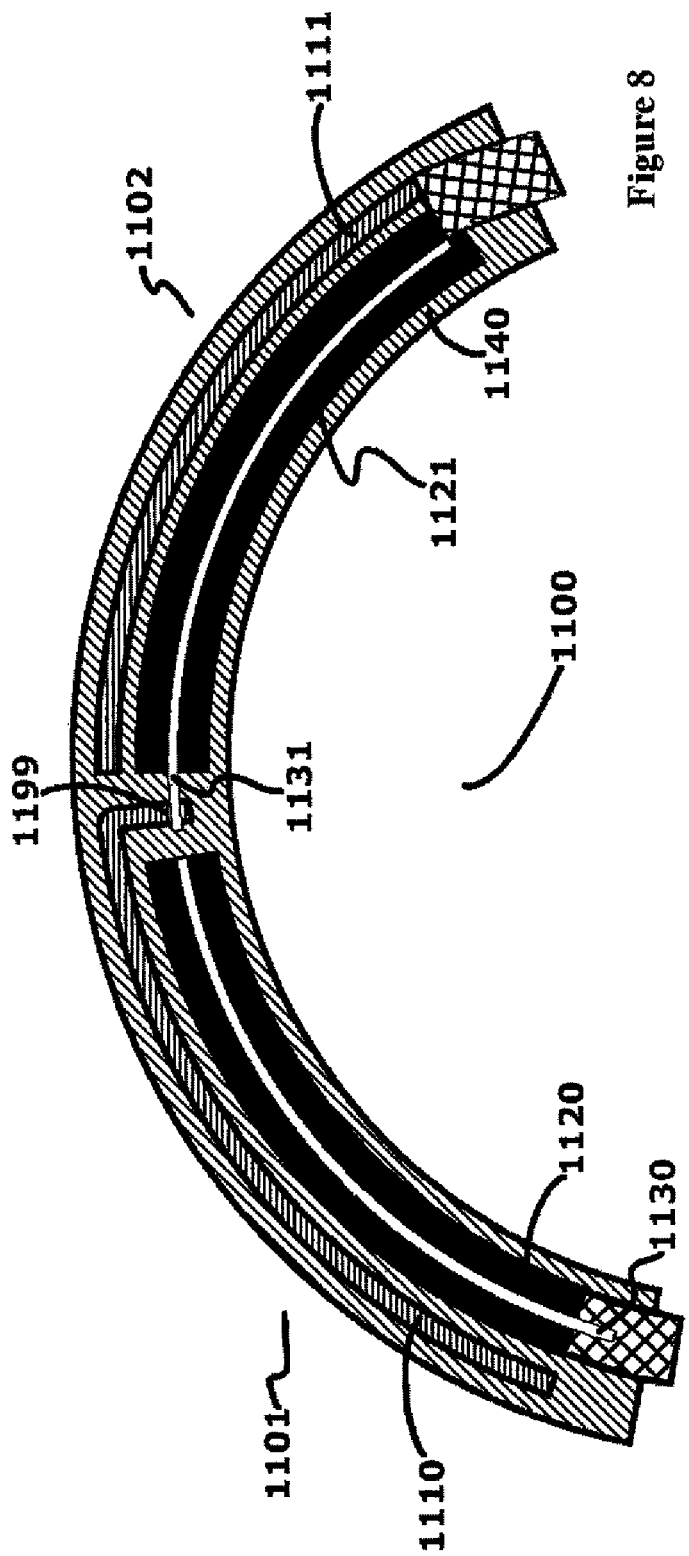

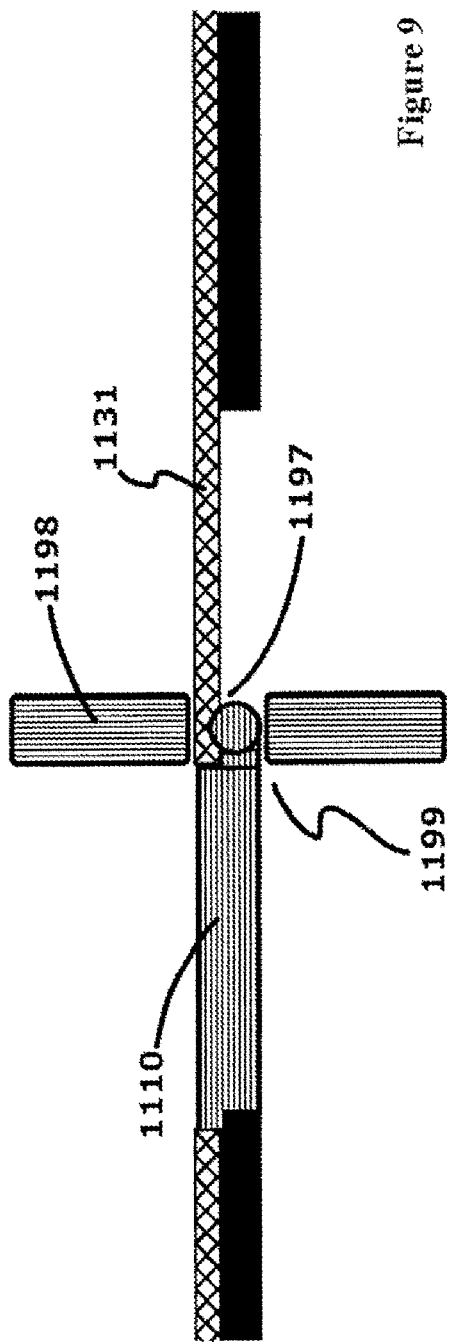

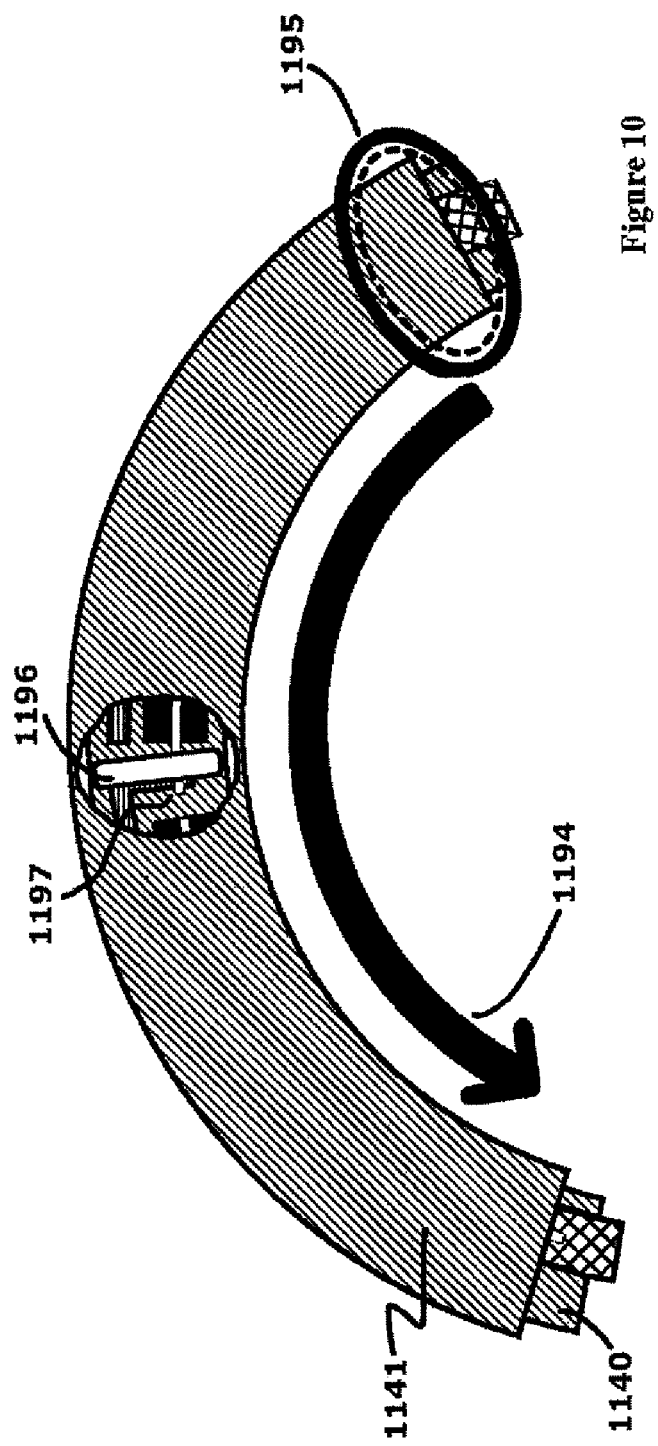

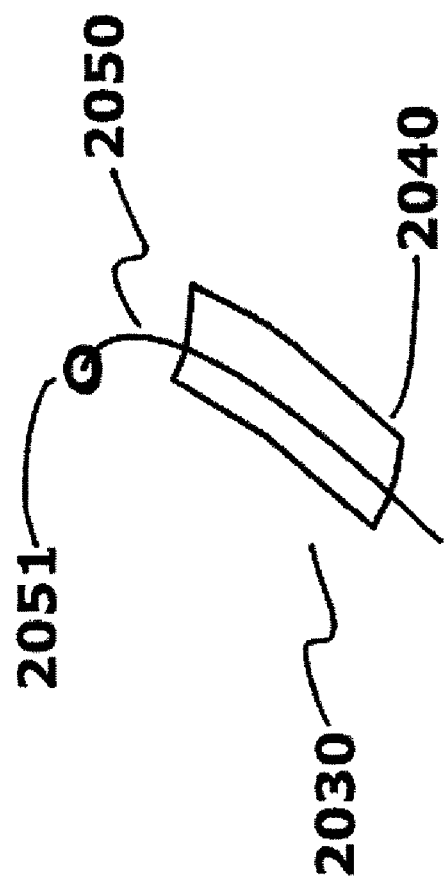

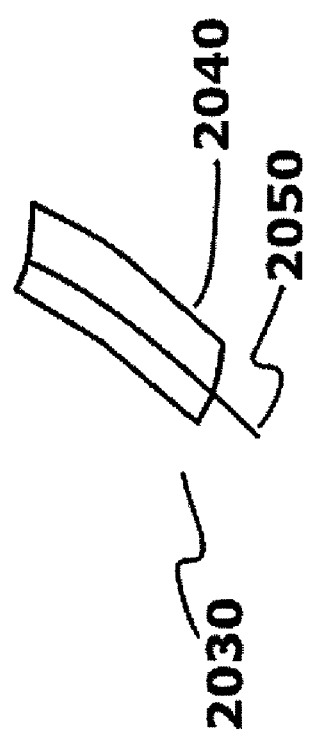

METHODS FOR THE MANUFACTURE OF FLEXIBLE MICROBATTERIES

CROSS REFERENCE TO RELATED APPLICATIONS

This patent application claims the benefit of U.S. Provisional Patent Application No. 62/487,262 filed Apr. 19, 2017 and is a continuation in part of U.S. patent application Ser. No. 15/326,161, filed Jan. 13, 2017, which in turn claims the benefit of U.S. Provisional Application No. 62/026,851 filed Jul. 21, 2014. The contents of each are herein incorporated by reference.

BACKGROUND OF THE INVENTION

Field of the Invention

The present invention generally relates to an electrochemical battery, and more particularly to a biocompatible micro-electrochemical cell.

Description of the Related Art

Recently, the number of medical devices and their functionality has begun to rapidly develop. These medical devices may include, for example, implantable pacemakers, electronic pills for monitoring and/or testing a biological function, surgical devices with active components, contact lenses, infusion pumps, and neurostimulators. Added functionality and an increase in performance to many of the aforementioned medical devices have been theorized and developed. However, to achieve the theorized added functionality, many of these devices now require self-contained energization means that are compatible with the size and shape requirements of these devices, as well as the energy requirements of the new energized components.

Some medical devices may include electrical components such as semiconductor devices that perform a variety of functions and may be incorporated into many biocompatible and/or implantable devices. However, such semiconductor components require energy, and thus energization elements may preferably also be included in such biocompatible devices. The topology and relatively small size of the biocompatible devices may create challenging environments for the definition of various functionalities. In many examples, it may be important to provide safe, reliable, compact and cost-effective means to energize the semiconductor components within the biocompatible devices. Therefore, a need exists for biocompatible energization elements formed for implantation within or upon biocompatible devices where the structure of the millimeter- or smaller-sized energization elements provides enhanced function for the energization element while maintaining biocompatibility.

One such energization element used to power a device may be a battery. When using a battery in biomedical type applications, it may be important that the battery structure and design accommodate aspects of biocompatibility. Therefore, a need exists for novel examples of forming biocompatible batteries for use in biocompatible energization elements that may have significantly improved containment aspects.

There are several micro-batteries which have been developed, some of which are designed to be implantable or otherwise associated with a medical or other device that require a power source for operation. For purposes of this specification, a micro-battery is defined by its relatively small dimensions. Specifically, at least one dimension (that is the length, width or thickness of the battery) shall be less than one millimeter (1.0 mm), and a second dimension shall be less than one centimeter (1.0 cm), whereas the volume of the micro-battery shall be less than 0.003 cc or three thousandths of a cubic centimeter.

It is possible to prepare batteries with these dimensions by additive manufacturing, by winding the electrodes, or by picking and placing active materials into place. These batteries can be made in a variety of shapes, including cylindrical, prismatic, or arcuate shapes. When biocompatible materials are used for the miniaturized power source, the power source is biocompatible. For example, carbon-zinc batteries, with a zinc salt electrolyte, zinc negative electrode, and manganese dioxide positive electrode can be biocompatible.

There exists a need for a micro-power supply that is biocompatible, may be used in medical and other small devices, and that is capable of repeated or continuous operation by providing required energy while the device is being, bent, flexed or otherwise manipulated and after such manipulation.

SUMMARY OF THE INVENTION

Accordingly, improved, flexible micro-batteries and designs for use in biocompatible energization elements have been disclosed. Micro-batteries used in ophthalmic medical devices may have unique and challenging requirements such as the need for mechanical robustness, a degree of flexibility, and biocompatibility. A contact lens using a micro-battery may require the battery to possess the qualities of the lens by having a long shelf life, having a measure of flexibility and maintaining integrity and operability after being manipulated, It may also need to be biocompatible for the period starting with lens manufacturing through the usage lifetime of the lens. This period exposes the micro-battery to the saline solution within the lens, either directly or through an intermediate layer, and the micro-battery may need not only maintain its capacity and ability to provide the required power to the lens, but also be adequately sealed to prevent leaching of the battery components. The dimensions of a micro-battery make isolation of the battery components particularly challenging as the surface area to volume ratio of the micro-battery may be very high.

The micro-battery may be stored within an ophthalmic lens for years, with the lens containing the micro-battery stored inside of a sealed package filled with a saline packing solution. This storage environment is similar to being stored in sterile saline solution in which the ophthalmic lens is immersed. This storage condition and the environment of an ophthalmic lens or other device in standard conditions may require that the micro-battery be designed to tolerate a given environment without failure due to water ingress through the packaging into the interior of the micro-battery which may also lead to swelling. The micro-battery packaging may have a measurable level of permeability. Osmotic pressure differences may, therefore, be created which may direct water to migrate into the micro-battery interior. Often, conventional battery electrolytes are non-aqueous and do not tolerate moisture contamination, or are highly concentrated acidic solutions (for example, zinc chloride) or basic solutions, such as potassium hydroxide. Use of an electrolyte with a low salt concentration may be a possible solution to reduce the osmotic pressure difference between the electrolyte and packing solution surrounding a lens containing the micro battery.

Another issue related to biocompatibility and osmotic pressure is the pH of the electrolyte. Typically, aqueous battery electrolytes may not be biocompatible. In a typical alkaline battery, the potassium hydroxide electrolyte is strongly alkaline to increase ionic conductivity. In a carbon zinc or LeClanche cells the acid pH of the electrolyte may strongly influence hydrogen gas production on the zinc surface. Strongly acidic or basic electrolytes are not biocompatible. Many typical corrosion inhibitors such as mercury are not biocompatible either.

Many micro-batteries, especially those mass-produced or those needing biocompatibility are encased in rigid exteriors. Their rigidity typically does not allow such batteries to be utilized in flexible devices. Furthermore, the rigid casing design limits the dimensions of the battery which are possible, since a minimum casing thickness is required to maintain rigidity.

Batteries utilizing conductive traces require both flexible traces and flexible substrates on which to support the trace. Such flexibility is not found in materials compatible with an oxidizing battery environment. Instead, the batteries of the prior art are typically constructed to be generally immobile after being manufactured. Movement of the battery may adversely affect connections, sealing of the exterior and otherwise affect the proper operation of the battery.

One general aspect includes a biomedical device including an electroactive component, a biocompatible battery, and a first encapsulating layer. The first encapsulating layer encapsulates at least the electroactive component and the biocompatible battery. In some examples, the first encapsulating layer may be used to define a skirt of a contact lens, surrounding internal components of an electroactive lens with a biocompatible layer of hydrogel that interacts with the user's eye surface. In some examples the nature of the electrolyte solution provides improvements to the biocompatibility of the biomedical device. For example, the composition of the electrolyte solution may have lowered electrolyte concentrations than typical battery compositions. In other examples, the composition of electrolytes may mimic the biologic environment that the biomedical device occupies, such as the composition of tear fluid in a non-limiting example.

According to one aspect of the present invention, an electrochemical micro-battery with biocompatible components is provided that comprises an anode, which may be cylindrical, extending along a first vector and a generally planar cathode extending along a second vector. The second vector is generally parallel to said first vector, and the cathode is disposed from the anode by a predetermined space. A cathode collector is in electrical contact with the cathode and extends along the second vector. In an aspect, the cathode collector is positioned within the cathode. The electrochemical micro-battery may also includes an electrolyte positioned generally surrounding both the anode and the cathode and positioned within the predetermined space to provide ionic conductivity between the anode and cathode.

In an aspect, the electrochemical battery may further comprise an anode current collector, wherein the anode and the anode current collector are bonded in electrical communication. The anode and the anode current collector are positioned to extend along the first vector in a first stacked arrangement, and the cathode and said cathode current collector are bonded in electrical communication, and are positioned to extend along the second vector in a second stacked arrangement. The first stacked arrangement and the second stacked arrangement are separated relative to each other by the predetermined space. A separator may be positioned between the first stacked arrangement and the second stacked arrangement within the predetermined space.

Packaging may generally surround the anode, cathode, cathode collector and the electrolyte. Terminal ends of the anode may extend through the packaging along a first vector, and the cathode collector may also extend through the packaging along a second vector. The packaging may have a generally uniform thickness. The packaging may be customized and accommodate an electrochemical battery cell which is formed into a desired shape in three dimensions. The packaging may prevent water and oxygen migration through said packaging. In an aspect, the packaging may comprise a polymer coated with a metal oxide. The water vapor transmission rate of the packaging may be less than 1 g/m2-day when measured at between 85 and 100% relative humidity and between 20 and 40 degrees Celsius. Thus, in an electrochemical micro-battery, with a volume equal to or less than three cubic millimeters (3.0 mm3), having an interior space which is encapsulated by biocompatible packaging, which in one aspect is positioned in ion communication with a bodily fluid, or an artificial bodily fluid such as saline solution, the packaging may act to inhibit mass transfer between the interior space and the bodily fluid or saline solution.

The electrochemical micro-battery may be shaped in all three dimensions. In some examples, the electrochemical micro-battery may include a planar shape as well as a shape wherein both a first vector and a second vector are arcuate, and wherein the first vector and second vector are concentric to each other.

The electrochemical micro-battery may also include an anode made of zinc. In an aspect of the invention the anode may be a zinc wire. The cathode of the present invention comprises manganese dioxide, a conductive additive material, and a binder. The cathode collector may comprise a wire shaped metal such as titanium and may be positioned adjacent or alternatively within the cathode. In an embodiment where the cathode collector is positioned within the cathode, the diameter of the anode may equal the thickness of the cathode, so that the thickness of the electrochemical cell equals the anode diameter in addition to the packaging thickness.

The first electrochemical cell of the micro-battery may operate as a single cell or be connected to a second electrochemical cell in series or parallel to the first electrochemical cell. In the series embodiment, the anode of the first electrochemical cell may be electrically connected to the cathode collector of the second electrochemical cell. The anode of the electrochemical cell may be welded to the cathode collector of the second electrochemical cell to form a mechanically secure and electrically communicating connection. The micro-battery cells may be independently packaged or the packaging of the first electrochemical cell and the packaging of the second electrochemical cell may be joined as to form a contiguous package. In an aspect, when the second electrochemical cell is connected in series to said electrochemical cell, the anode of the electrochemical cell is electrically connected to a cathode collector of said second electrochemical cell, and the packaging of the electrochemical cell and the packaging of the second electrochemical cell are joined as to form a contiguous package. In an aspect wherein the anode of the electrochemical cell further includes an anode collector in electrical communication with the anode of the electrochemical cell, the anode collector extends out of the electrochemical cell and extends into the second electrochemical cell, and wherein the anode collector is electrically connected to the cathode of the second electrochemical cell, and wherein the packaging of the electrochemical cell and the packaging of the second electrochemical cell are joined as to form a contiguous package.

In an aspect, the volume of the electrochemical battery may be equal to or less than three cubic millimeters (3.0 mm3). The anode may have a length extending along the first vector, and a width and thickness extending perpendicular to said first vector, wherein the width is greater than the thickness, and the ratio of the length to the width is greater than twenty to one (20:1). The cathode may have a length extending along the second vector, and a width and thickness extending perpendicular to the second vector, the width is greater than said thickness, and the ratio of the length to the width is greater than ten to one (10:1).

In an aspect, the interior space of the micro-battery may comprise an aqueous neutral electrolyte solution, such as zinc acetate. The concentration of the zinc acetate in the electrolyte may comprise less than ten weight percent of said electrolyte (10 wt %). The pH of the electrolyte may be between 6 and 8, wherein the packaging is positioned in ionic communication with a saline solution, the difference between the osmotic pressure of the electrolyte relative to the osmotic pressure of the saline solution is less than ten atmospheres (10 atm). The anode may comprise zinc and the cathode may comprise manganese dioxide. The anode current collector and the cathode current collector may each comprise titanium, tantalum, platinum or other electrically conductive, flexible, biocompatible material. The anode may include both zinc powder, and a zinc article such as zinc foil extending the length of the battery, wherein the zinc powder is in electrical communication with the zinc article.

The micro-battery may be constructed according to a method comprising the steps of: forming a cathode having a length and thickness, wherein the ratio of the length to the thickness is equal to or greater than 50:1; attaching the cathode to a cathode collector which extends the length of the cathode to form a cathode assembly; forming an anode having a length and thickness, wherein the ratio of the length to the thickness is equal to or greater than 50:1; distribute an aqueous electrolyte around both the anode and the cathode assembly to enable ionic communication between the cathode and anode; and placing the cathode assembly, the electrolyte and the anode within a first and second portion of thermoplastic packaging. The first and second portions may envelop all of the electrolyte, a portion of the cathode assembly and a portion of the anode to form a battery interior bounded by sides of the battery interior, except to enable an end portion of the cathode assembly and anode to extend out of the battery interior at both a first and second end of the micro-battery; sealing the battery interior by heating the first and second portions of the packaging along the length of the battery interior sides, and sealing the battery interior at the first and second end of the micro-battery by sealing the packaging around the extending anode and cathode assembly; and removing packaging external to the sealed micro-battery. In an aspect of the method, the first and second portions of the packaging may be placed within an ultrasonic welder, and the ultrasonic welder may seal the first and second portions of the packaging around the battery interior by sealing the packaging, and cutting the packaging at the seal in one step. In an aspect, a separator may be inserted between the anode and cathode. In another aspect, the anode is attached to an anode collector, and the anode collector is positioned to extend out of the battery interior at both the first and second ends of the micro-battery.

These and other features, advantages, and objects of the present invention will be further understood and appreciated by those skilled in the art by reference to the following specification, claims, and appended drawings.

BRIEF DESCRIPTION OF THE DRAWINGS

FIG. 5A is an exemplary perspective view of the packaging portion of the electrochemical battery cell, according to one embodiment;

FIG. 7 is an exemplary cross-sectional view of the shaped battery package illustrating two cells in series in an arcuate shape;

FIG. 8 is an exemplary cross-sectional view of the shaped battery package showing two cells in series in an arcuate shape and highlighting how the cells are electrically connected;

FIG. 9 is an exemplary enlarged section of the electrical connection between the two cells of the shaped battery package depicted in FIG. 8;

FIG. 10 is an exemplary exploded view of the electrochemical battery cell showing two cells in series in an arcuate shape, and a laser weld beam for sealing the cell packaging;

FIG. 11B is an exemplary perspective view of an interim form of the cathode and cathode collector assembly of the present invention as described in the illustrative example;

FIG. 11C is an exemplary perspective view of the cathode and cathode collector assembly of the present invention as described in the illustrative example.

DETAILED DESCRIPTION OF THE INVENTION

Figure 1:
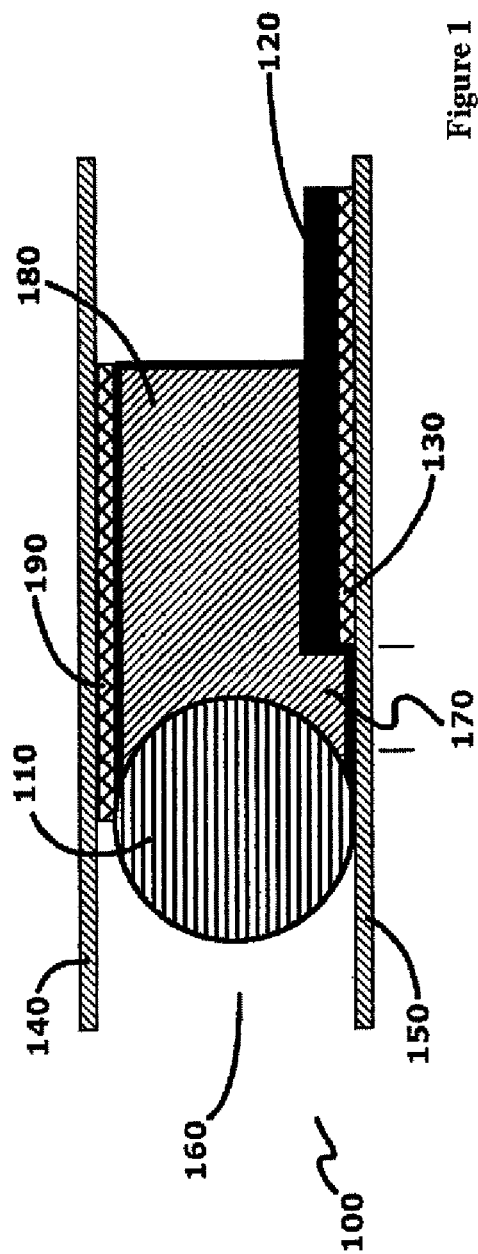
FIG. 1 is an exemplary cross-sectional view of an electrochemical battery cell taken along a normal to the vector L (length)

Methods of forming flexible micro-batteries with improved biocompatibility are disclosed in the present application. In the following sections, detailed descriptions of various examples are described. The descriptions of examples are exemplary embodiments only, and various modifications and alterations may be apparent to those skilled in the art. Therefore, the examples do not limit the scope of this application. In some examples, these biocompatible batteries may be designed for use in, or proximate to, the body of a living organism.

Glossary

In the description and claims below, various terms may be used for which the following definitions will apply:

"Anode" as used herein refers to an electrode through which electric current flows into a polarized electrical device. The direction of electric current is typically opposite to the direction of electron flow. In other words, the electrons flow from the anode into, for example, an electrical circuit.

Battery as used herein refers to an electrochemical power source which consists of a single electrochemical cell or a multiplicity of electrochemical cells, suitably connected together to furnish a desired voltage or current. The cells may be primary (non-rechargeable) or secondary (rechargeable) cells.

"Binder" as used herein refers to a polymer that is capable of exhibiting elastic responses to mechanical deformations and that is chemically compatible with other energization element components. For example, binders may include electroactive materials, electrolytes, polymers, etc. In some examples, binder may refer to a substance that holds particles and/or particles+liquid together in a cohesive mass.

"Biocompatible" as used herein refers to a material or device that performs with an appropriate host response in a specific application. For example, a biocompatible device does not have toxic or injurious effects on biological systems.

"Cathode" as used herein refers to an electrode through which electric current flows out of a polarized electrical device. The direction of electric current is typically opposite to the direction of electron flow. Therefore, the electrons flow into the cathode of the polarized electrical device, and out of, for example, the connected electrical circuit.

"Coating" as used herein refers to a deposit of material in thin forms. In some uses, the term will refer to a thin deposit that substantially covers the surface of a substrate it is formed upon. In other more specialized uses, the term may be used to describe small thin deposits in smaller regions of the surface.

"Electrode" as used herein may refer to an active mass in the energy source. For example, it may include one or both of the anode and cathode.

"Energized" as used herein refers to the state of being able to supply electrical current or to have electrical energy stored within.

"Energy" as used herein refers to the capacity of a physical system to do work. Many uses of the energization elements may relate to the capacity of being able to perform electrical actions.

"Energy Source" or "Energization Element" or "Energization Device" as used herein refers to any device or layer which is capable of supplying energy or placing a logical or electrical device in an energized state. The energization elements may include batteries. The batteries may be formed from alkaline type cell chemistry and may be solid-state batteries or wet cell batteries including aqueous alkaline, aqueous acid or aqueous salt electrolyte chemistry or non-aqueous chemistries, molten salt chemistry or solid state chemistry. The batteries may be dry cell (immobilized electrolyte) or wet cell (free, liquid electrolyte) types.

"Fillers" as used herein refer to one or more energization element separators that do not react with either acid or alkaline electrolytes. Generally, fillers may include substantially water insoluble materials such as carbon black; coal dust; graphite; metal oxides and hydroxides such as those of silicon, aluminum, calcium, magnesium, barium, titanium, iron, zinc, and tin; metal carbonates such as those of calcium and magnesium; minerals such as mica, montmorollonite, kaolinite, attapulgite, and talc; synthetic and natural zeolites such as Portland cement; precipitated metal silicates such as calcium silicate; hollow or solid polymer or glass microspheres, flakes and fibers; and the like.

"Functionalized" as used herein refers to making a layer or device able to perform a function including, for example, energization, activation, and/or control.

"Mold" as used herein refers to a rigid or semi-rigid object that may be used to form three-dimensional objects from uncured formulations. Some exemplary molds include two mold parts that, when opposed to one another, define the structure of a three-dimensional object.

"Power" as used herein refers to work done or energy transferred per unit of time.

"Rechargeable" or "Re-energizable" as used herein refer to a capability of being restored to a state with higher capacity to do work. Many uses may relate to the capability of being restored with the ability to flow electrical current at a certain rate for certain, reestablished time periods.

"Reenergize" or "Recharge" as used herein refer to restoring to a state with higher capacity to do work. Many uses may relate to restoring a device to the capability to flow electrical current at a certain rate for a certain reestablished time period.

"Released" as used herein and sometimes referred to as "released from a mold" means that a three-dimensional object is either completely separated from the mold, or is only loosely attached to the mold, so that it may be removed with mild agitation.

"Stacked" as used herein means to place at least two component layers in proximity to each other such that at least a portion of one surface of one of the layers contacts a first surface of a second layer. In some examples, a coating, whether for adhesion or other functions, may reside between the two layers that are in contact with each other through said coating.

"Traces" as used herein refer to energization element components capable of connecting together the circuit components. For example, circuit traces may include copper or gold when the substrate is a printed circuit board and may typically be copper, gold or printed film in a flexible circuit. A special type of trace is the current collector. Current collectors are traces with electrochemical compatibility that make the current collectors suitable for use in conducting electrons to and from a cathode or anode of an electrochemical cell.

There may be other examples of how to assemble and configure batteries according to the present invention, and some may be described in following sections. However, for many of these examples, there are selected parameters and characteristics of the batteries that may be described in their own right. In the following sections, some characteristics and parameters will be focused upon.

Figure 2:
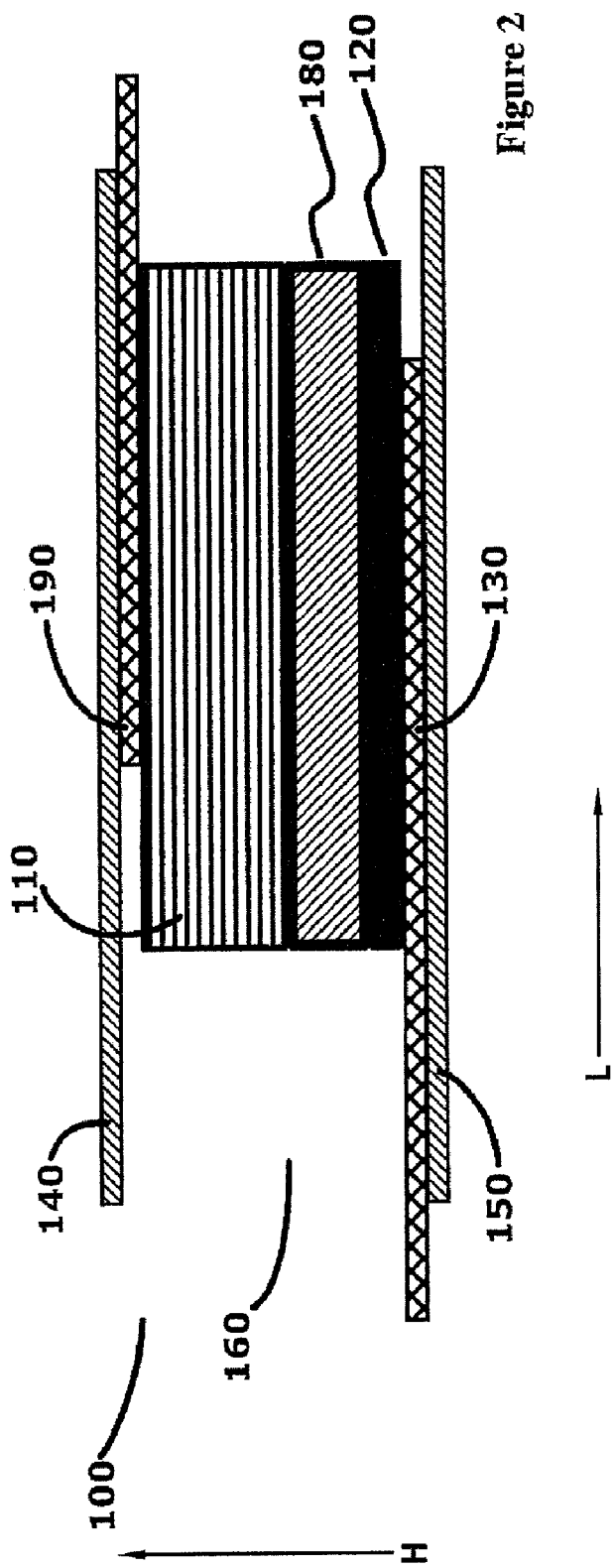
FIG. 2 is an exemplary cross-sectional view of the electrochemical battery cell taken along plane normal to the vector H (height)

Referring to FIG. 1 and FIG. 2, there is shown two different cross sectional representations of an exemplary electrochemical battery cell 100 according to one embodiment. FIG. 1 is a cross section representation along a plane normal to the vector L (length) and FIG. 2 is a cross section representation along a plane normal to the vector H (height).

The electrochemical battery cell includes a cylindrical anode 110 which extends along the length of the electrochemical battery cell and serves as the negative electrode.

More specifically, the anode 110 extends along a vector parallel to the length vector L shown in FIG. 2. In this embodiment, the anode 110 is generally cylindrical in shape and circular in cross section. The diameter of the anode 110 is small enough and its aspect ratio (length to width ratio) is large enough to enable flexibility of the anode 110. The diameter may be sized large enough to accommodate the absence of any current collector. As the electrochemical battery cell discharges, reactive material from the anode may electrochemically react and go into solution. As the anode reactive material leaves the anode, the surface of the anode may pit or otherwise change and a general decreasing diameter may be realized. The remaining anode material may remain contiguous to remain capable of acting as an anode current collector throughout its length and as such may be capable of conducting electrons from the anode out of the electrochemical battery cell.

As may be described again below in more detail, in some examples the anode 110 is positioned on one side of the electrochemical battery cell in this embodiment adjacent the exterior first and second packaging portions 140 and 150. The first packaging portion 140 and the second packaging portion 150 are disposed relative each other to form a cell interior 160. The packaging portions are manufactured from a material that may be bonded or otherwise sealed to itself. The packaging portion material may also be flexible and capable of enclosing all components located within the cell interior 160.

In some examples, the electrochemical battery cell further includes a cathode 120 which also extends along the length of the electrochemical battery cell and serves as the positive electrode. More specifically, the cathode 120 extends along a vector parallel to the length vector L shown in FIG. 2. In this embodiment, the cathode 120 is generally planar and rectangular in cross section. The cathode may be positioned in electrical contact with a cathode current collector 130, and in this embodiment, may be attached onto the cathode current collector 130. This arrangement of coating the cathode 120 onto a flexible conducting current collector 130 provides a flexible cathode construction that remains coherent while the electrochemical battery cell 100 is twisted, bent or otherwise contorted. As the electrochemical battery cell electrochemically discharges, reactive material from the cathode 120 may electrochemically react and possibly expand. The cathode may be designed to accommodate such expansion by being made with an appropriate porosity and by being made from appropriate ingredients that accommodate any such expansion. Such accommodation may enable the cathode 120 to maintain adhesion with the cathode current collector 130 and otherwise remain coherent.

The cathode 120 and the cathode current collector 130 are shown positioned and supported on the second packaging portion 150 and at a position opposed to the anode 110 within the cell interior 160. Although the sizes of the anode 110 and the cathode 120 shown in FIG. 1 and FIG. 2 are not necessarily to scale, the relative positions of the anode and cathode are gapped by a predetermined space 170. The dimensions of the predetermined space within the cell interior may be important to ensure the anode and cathode do not make direct contact with each other which would cause a battery short circuit. The dimension may also not be so large as to prevent effective ionic charge diffusion which directly relates to the rate capability of the electrochemical battery cell. Although in alternative embodiments, a permeable membrane battery separator may be used, the cell construction of the present embodiment obviates the need for added manufacturing complexity and expense of adding such a component.

The cathode 120 and the anode 110 ionically communicate via an electrolyte 180 which is positioned such that both the anode and cathode may ionically communicate with the electrolyte material. The electrolyte 180 may allow the flow of electric charge between the anode 110 and the cathode 120. The electrolyte 180 may be a liquid, gel or semi-solid provided that it is flexible and capable of moving within the cell interior 160 while performing its task of providing ionic diffusion between the anode 110 and cathode 120.

The electrons generated by the electrochemical battery cell 100 may be conducted from the cell via an anode collector tab 190. This anode collector tab 190 may be affixed to an end of the anode 110 to be in electric communication with the anode 110. The anode collector tab 190 provides a shape appropriate extension of the anode 110 so that the cell interior 160 may be appropriately sealed, with both the anode 110 and cathode 120 electrically communicating exterior of the cell interior 160 and both first and second packaging portions 140 and 150. The position of the anode collector tab 190 in FIG. 1 and FIG. 2 is shown intermediate the anode 110 and the first packaging portion 140. As may be seen, this positioning may add height or a protrusion to the electrochemical battery cell 100 and an alternative position may be preferred to avoid increasing these dimensions. The anode collector tab 190 is shaped relative to what it may be connecting to in a device. This shape may be selected by one skilled in the art to create an electrically secure connection between the anode tab and the device.

Although not shown in the embodiment of FIG. 1 and FIG. 2, both the anode collector tab 190 and the cathode current collector 130 may extend beyond the respective ends of the anode 110 and the cathode 120. These extending portions of the anode collector tab 190 and the cathode current collector 130 enable more efficient sealing of the cell interior 160. The first and second packaging portions 140 and 150 may be both sealed to each other to seal the cell interior 160 from the exterior or the electrochemical battery cell 100, and sealed around the anode collector tab 190 and the cathode current collector 130 which extend exterior the sealed first and second packaging portions 140 and 150. As such, the anode collector tab 190 becomes the negative exterior contact for the electrochemical battery cell 100, and the cathode current collector 130 becomes the positive exterior contact for the electrochemical battery cell.

In operation, when a load (not shown) is electrically connected to both the anode collector tab 190 and the cathode current collector 130 to form a circuit, the anode 110 releases electrons via the anode collector tab 190 to the negative exterior contact while simultaneously releasing ions into the electrolyte 180. The cathode 120 accepts the electrons flowing from the circuit through the positive exterior contact and the cathode current collector 130 and electro chemically reacts to equilibrate the chemical potential of the electrochemical battery cell. The present arrangement of the electrochemical battery cell 100 may effectively operate while in torsion, while being bent, or otherwise manipulated.

Figure 3:
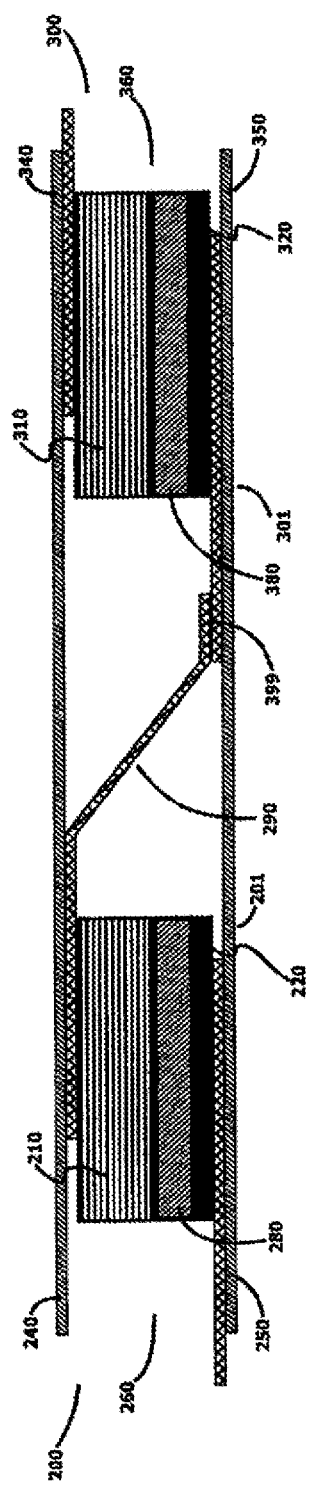
FIG. 3 is an exemplary cross-sectional representational view of the electrochemical battery cell of the present invention.

The electrochemical battery cell 100 shown in FIG. 1 and FIG. 2 may be electrically and mechanically coupled in series with an identical cell as shown in FIG. 3. In FIG. 3, there is shown a first electrochemical battery cell 200 and its respective negative end portion 201. The first electrochemical battery cell 200 possesses an anode 210, a cathode 220 and an anode collector tab 290. Also, shown in FIG. 3 is a second electrochemical battery cell 300 and its positive end portion 301. The second electrochemical battery cell also has an anode 310, a cathode 320 and a cathode current collector 330. As shown in FIG. 3 the anode collector tab 290 of the first electrochemical battery cell 200 is connected to the cathode current collector 330 of the second electrochemical battery cell 300 at connection point 399. This mechanical and electrical coupling arrangement creates a multi-cell battery with two electrochemical battery cells in series to provide an effective voltage twice that of each individual cell. Alternative coupling arrangements may be used to create parallel and other multi-cell batteries using two or more cells.

Figure 4:
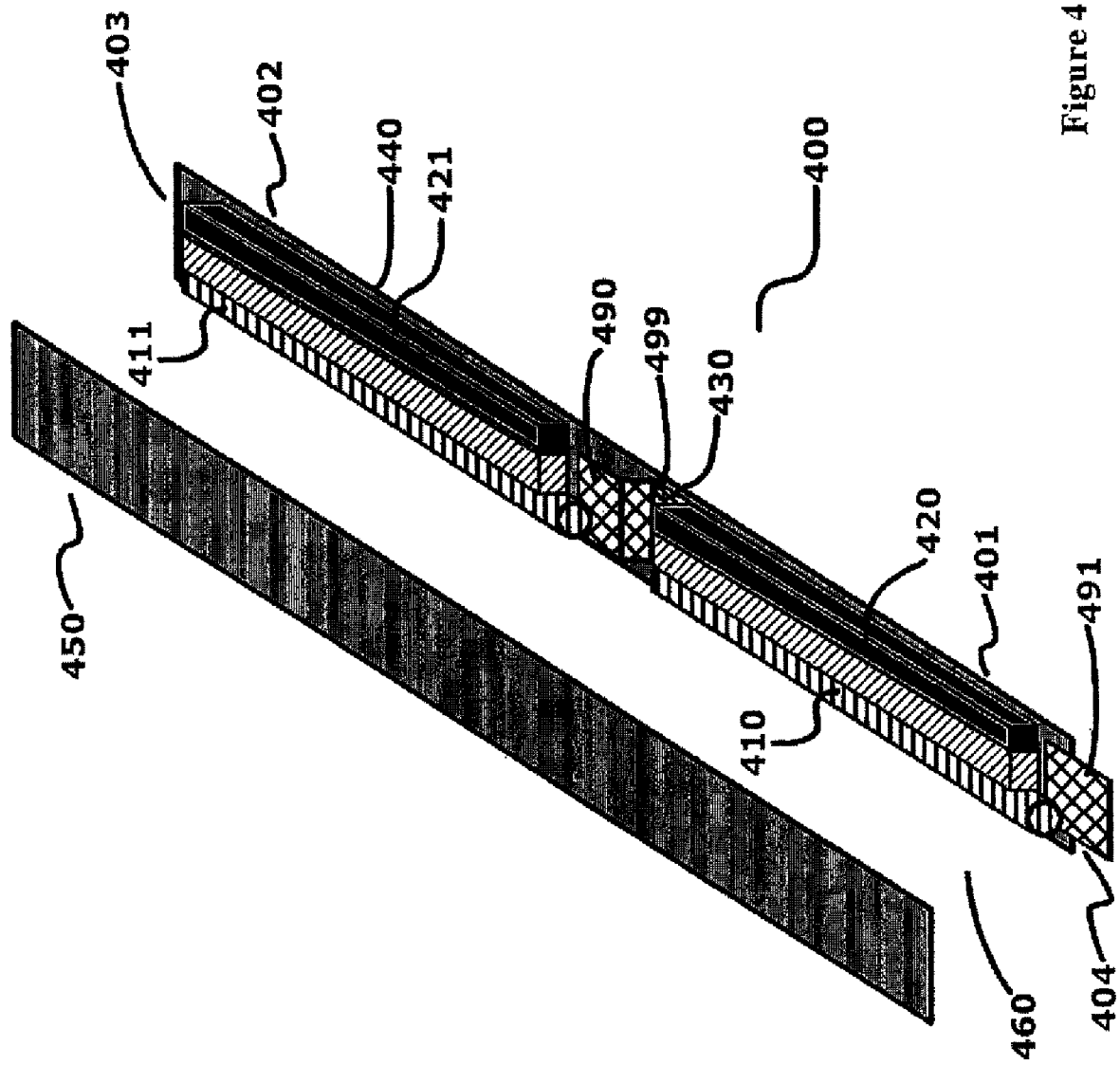
FIG. 4 is an exemplary perspective view of the electrochemical battery cell with the packaging portion exploded.

The respective packaging portions 240 and 340, and 250 and 350 are shown joined to form a contiguous exterior surface or may be manufactured as single packaging portions. However as may be described in more detail the respective cell interiors 260 and 360 are preferably segregated. In FIG. 4, there is shown an alternative view of the two batteries in series 400. A first electrochemical battery cell 401 is electrically and mechanically coupled to a second electrochemical battery cell 402. Both the first electrochemical battery cell 401 and the second electrochemical battery cell 402 have respective anodes 410 and 411, and respective cathodes 420 and 421. Each cathode is associated with and electrically coupled to a cathode current collector, and the first electrochemical battery cell cathode 420 is associated with first electrochemical battery cell cathode current collector 430, and the second electrochemical battery cell cathode 421 is likewise associated with a second electrochemical battery cell cathode current collector (not shown). The second electrochemical battery cell anode 411 is electrically and mechanically associated with a second electrochemical battery cell anode collector tab 490 which is also electrically and mechanically associated with the first electrochemical battery cell cathode current collector 430 at connection point 499.

The two electrochemical cells in series are surrounded on the cathode side by a first packaging portion 440 which extends the length of the two cells in series but is terminated at a first end 403 to enable the second electrochemical battery cell cathode current collector to overhang the first packaging portion. At a second end 404, the first packaging portion is similarly terminated to enable the first electrochemical battery cell anode collector tab 491 to extend beyond the second end. A second packaging portion 450 similar in length and width to the first packaging portion 440 is positioned adjacent the anode side of the two batteries in series and the cell interior 460 may be sealed by associating the first packaging portion 440 and second packaging portion adhesively or by welding in a manner that allows both the second electrochemical battery cell cathode current collector and the first electrochemical battery cell anode collector tab to extend beyond the packaging portions to enable them to be in electrical communication with an external load (not shown).

It may be preferred to segregate the cell interior 460 into individual cell interiors associated with each electrochemical battery cell. This may be done by providing a divider adjacent the connection point 499. Referring to FIG. 5A there is shown a packaging portion 500 that may be used to provide the cell interior segregation of this embodiment. The packaging portion 500 includes a divider 510 which may be affixed to the packaging portion at a segregation spot 520 on the packaging portion. The divider 510 may be configured to act as a dam between two electrochemical battery cells in series to prevent ionic conduction and convective flow between the cells. The divider 510 may be laser welded to the packaging portion and then again laser welded when the packaging portion 500 is sealed relative a second packaging portion via laser welding or an alternative connecting method. In an alternative embodiment, the divider may be affixed via alternative joining methods such as ultrasonic welding, or heat welding methods.

Figure 5B:
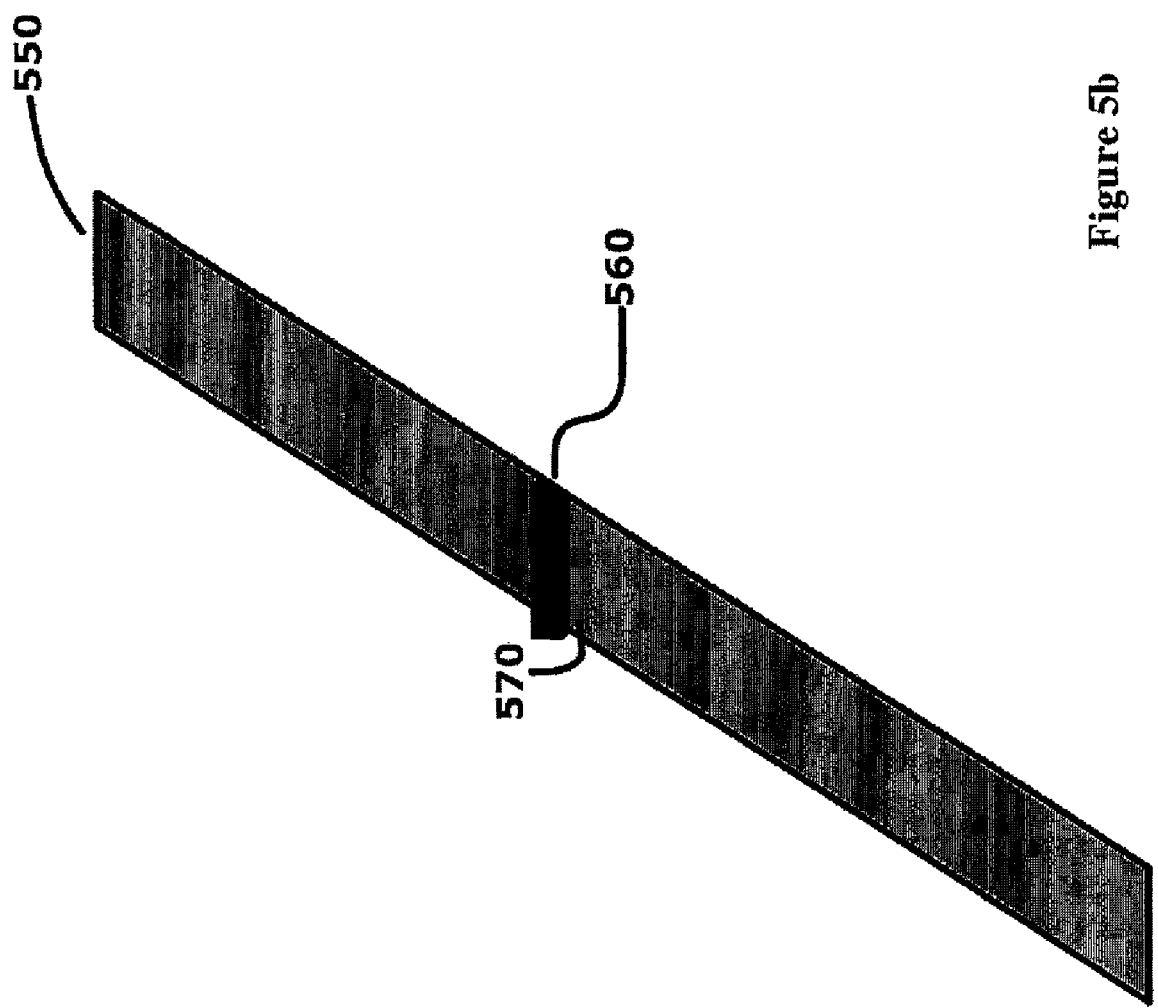
FIG. 5B is an exemplary perspective view of the packaging portion of the electrochemical battery cell, according to another embodiment.

In FIG. 5B, there is shown an alternative embodiment of providing segregation of the cell interior. A packing portion 550 includes a divider 560 at a segregation spot 570 on the packaging portion. The divider 560 may be secured to the packaging portion and a second packaging portion via adhesive and more preferably via UV-cured adhesive. The first and second packaging portions may be sealed relative each other at their peripheries and the divider 560 adhesively secured to both packaging portions to provide the segregation of the cell interior.

Figure 6:
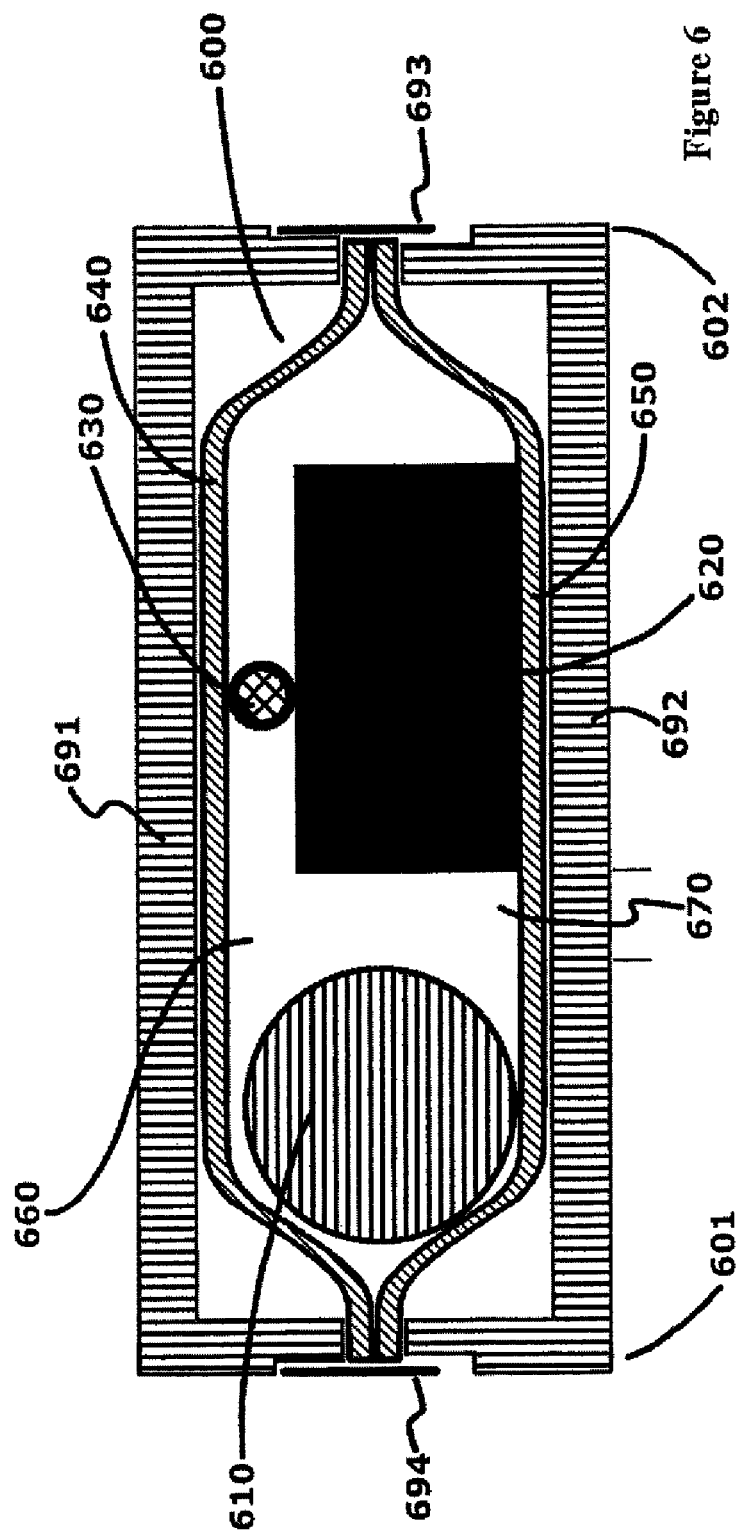
FIG. 6 is an exemplary cross-sectional view of the electrochemical battery cell of the present invention disposed in an ultrasonic welding fixture depicting a method of sealing the exterior packaging.

In FIG. 6, there is shown a cross-sectional view of an alternative embodiment of the electrochemical battery cell 600. In this embodiment, the electrochemical battery cell 600 possesses a cylindrical shaped electrochemical battery cell cathode current collector 630, which is shown positioned between the electrochemical battery cell cathode 620 and a first packaging portion. Although not shown, the electrochemical battery cell cathode current collector may alternatively be disposed entirely within or partially within the cathode 620. An anode 610 is located within the cell interior 660 at a predetermined distance 670 from the cathode 620. The cell interior is filled with electrolyte (not shown) to provide required ionic conductivity between the anode and cathode electrodes.

A method of joining both the first packaging portion 640 and the second packaging portion 650 along their respective peripheries may be described using FIG. 6. The electrochemical battery cell 600 may be placed within an ultrasonic welding fixture which is shown representatively in cross section surrounding a portion of the electrochemical battery cell 600. The ultrasonic welding fixture comprises both an ultrasonic welding horn 691 and an ultrasonic welding anvil 692. The electrochemical battery cell 600 is placed within the fixture and the ultrasonic welding horn 691 is brought into contact with the first packaging portion 640 at the locations where a weld is desired. In this methods embodiment, a weld is desired both at the anode side of the electrochemical battery cell 601 and at the cathode side of the electrochemical battery cell 602. A controlled pressure is applied by the fixture to the electrochemical battery cell bringing together the first packaging portion 640 and the second packaging portion 650. The ultrasonic horn is vibrated at a frequency appropriate for the material at the desired amplitude for a predetermined amount of time that is required to weld the first and second packaging portions. The controlled pressure may be maintained for a second predetermined time to allow the packaging portions to fuse.

Prior art ultrasonic welding of plastics takes place with the motion of the ultrasonic horn largely perpendicular to the plane of the items being joined (for the side seal, along vector H shown in FIG. 2), and this may result in a wide joint which may be objectionable. In some examples, when the motion of the ultrasonic horn is largely in the same plane as the side seal (for the linear side seal, a plane extending along vector L shown in FIG. 2), a relatively narrower seal may be achieved. The vector of the horn's motion is in the same plane as the edge of the package being sealed. For nonlinear side seams (for example, arcuate side seams), the horn's motion relative to the side seam may vary at different positions along the side seam, but may remain in the same plane as the packaging being welded.

Excess packaging may be mechanically trimmed at ends 693 and 694, for example, by laser-cutting, ultrasonic cutting, tool-die degating, or waterjet cutting) such that the packaging portions exterior the weld is removed. Alternatively, ultrasonic weld time may be extended to cut the sealed ends 693 and 694 while sealing the packaging portions. Once the packaging portions have been welded along the periphery thus sealing the electrochemical battery cell, the second controlled pressure is removed and the ultrasonic welding horn is retracted. By this joining process, many electrochemical battery cells may be consecutively sealed.

The present electrochemical battery cell configuration is not restricted to a linear, planar construction, and instead may be constructed in multiple shapes and sizes according to various embodiments. The components of the electrochemical battery cell, as well as the packaging, may be used to shape the electrochemical battery cell to its desired shape.

In FIG. 7 there is shown the electrochemical battery cell 1000 in an arcuate shape. In this embodiment, two electrochemical battery cells are connected in series. A first electrochemical battery cell 1001 is both electrically and mechanically connected to a second electrochemical battery cell 1002 at a connection point 1099. Both the first and second electrochemical battery cells are shown resting on a first packaging portion 1040. Although not shown, a second packaging portion is associated with the first packaging portion to form a contiguous exterior packaging exterior for the electrochemical battery cell.

The first electrochemical battery cell 1001 includes an anode 1010 and a cathode 1020. The cathode is positioned in electrical communication with a first electrochemical battery cell cathode current collector 1030. The second electrochemical battery cell 1002 similarly includes an anode 1011, and a cathode 1021. The cathode 1021 is positioned adjacent and in electrical communication with a second electrochemical battery cell cathode current collector 1031. Both the anodes 1010 and 1011 possess associated anode collector tabs which are both electrically and mechanically connected to an anode end to conduct electrons.

At connection point 1099, there is shown an electrical and mechanical connection between the first electrochemical battery cell anode collector tab 1090 and the second electrochemical battery cell cathode current collector 1031. The connection may be welded or alternatively made so that electricity may flow between both the first and second electrochemical battery cells, and so that it provides a measure of strength so that the electrochemical battery cell 1000 is fixed in the desired shape.

Each of these components in the electrochemical battery cell extend along parallel arcuate paths or vectors. For example, the anode 1010 and the anode 1011 extend along an arcuate vector the length of which is approximately the length of the electrochemical battery cell 1000. The cathode 1020 and the cathode 1021 extend along a separate arcuate vector which extends in parallel to the anode vector. The electrochemical battery cell 1000 may be configured in the shown planar C-shape, or the arcuate shape may be non-planar such as frustoconical or shaped to extend about a spherical segment such as in the body of a contact lens. The shape may be maintained by the rigidity of the components or alternatively by inclusion of a structural portion which would be included within the electrochemical battery cell but not be an active component of the electrochemical reaction. For example, a die cut titanium foil may be placed within the cell interior and intermediate the first and second packaging portions. The foil structural portion would act to maintain the desired shape of the electrochemical battery cell while not significantly increasing the non-active volume of the electrochemical battery cell.

In FIG. 8, there is shown a top sectional view of an alternative embodiment of the electrochemical battery cell 1100. In this embodiment, the electrochemical battery cell 1100 possesses a cylindrical shaped electrochemical battery cell cathode current collectors 1130 and 1131, which is shown positioned between the electrochemical battery cell cathode 1120 and 1121 and a packaging portion (not shown). Although not shown, the electrochemical battery cell cathode current collector may alternatively be disposed within or partially within the cathodes 1120 and 1121. The wire shaped cathode current collectors in combination with the wire shaped anodes provide a structural rigidity which obviates the need for any non-active structural portion. The two electrochemical battery cells 1101 and 1102 that comprise the electrochemical battery cell 1100 are electrically and mechanically connected at connection point 1199.

The wire shaped first electrochemical battery cell anode 1110 and the second electrochemical battery cell cathode current collector 1131 may be joined by an ultrasonic weld as shown in FIG. 9. A compressive force holds the first electrochemical battery cell anode 1110 and the second electrochemical battery cell cathode current collector 1131 together while the ultrasonic welding fixture 1198, which is representatively shown, acts to weld the two wire shaped components to form a mechanically connected joint 1197. Alternatively, the joint 1197 may be created using resistive welding of another joining technique to create an electrically communicating and mechanically sound joint. Another joining method useful to encapsulate the electrochemical battery cell is laser beam welding.

In FIG. 10, the electrochemical battery cell 1100 is shown assembled with mechanically connected joint 1197 already formed and divider 1196 created to segregate the cell interior of the first and second electrochemical battery cells. A first and second packaging portion 1140 and 1141 of equal size are placed with their peripheries aligned and compressed to create a pressurized periphery along the entire periphery of the packaging portions. This may be done in a fixture which creates the pressurized periphery at the same time, or sequentially with a moving jig or fixture. While the periphery is compressed, a laser weld beam may be passed along the electrochemical battery cell (in the direction shown by vector W 1194) and the compressed periphery that passes through the laser weld beam is welded by being melted and then joined during re-solidification. The laser fires many heating pulses per second forming separate overlapping spot welds that form a seam along the packaging portion periphery. So as not to cause local heating of the cell interior, battery components and electrolyte an appropriate laser wavelength is chosen. For polypropylene packaging material, 800 nm laser light is preferred.

Another embodiment of the electrochemical battery cell 1 100 in FIG. 8 may be described with an alternative anode construction. In this embodiment, the two electrochemical battery cells 1101 and 1102 that comprise the electrochemical battery cell 1100 are electrically and mechanically connected by sharing a common component. The anodes 1110 and 1111 each additionally comprise an anode current collector which is electrically conductive. The active anode material is then disposed onto or adjacent each anode current collector to be in electrical communication, while maintaining physical contact with the anode current collector. The use of such an anode current collector enables it to also be used as a cathode collector in an adjacently connected cell. For example, the electrochemical battery cell anode current collector (not shown) of the first electrochemical battery cell 1101 may extend into the second electrochemical battery cell and be used as the cathode current collector 1131 of the second electrochemical battery cell. By use of this common cell component, the first electrochemical battery cell 1101 and the second electrochemical battery cell 1102 are electrically and mechanically connected without the need for any weld or joint.

EXAMPLES

The compositions and processes described here, and ways to make and use them are illustrated in the following examples.

Example 1

Substrate Preparation

Figure 11A:
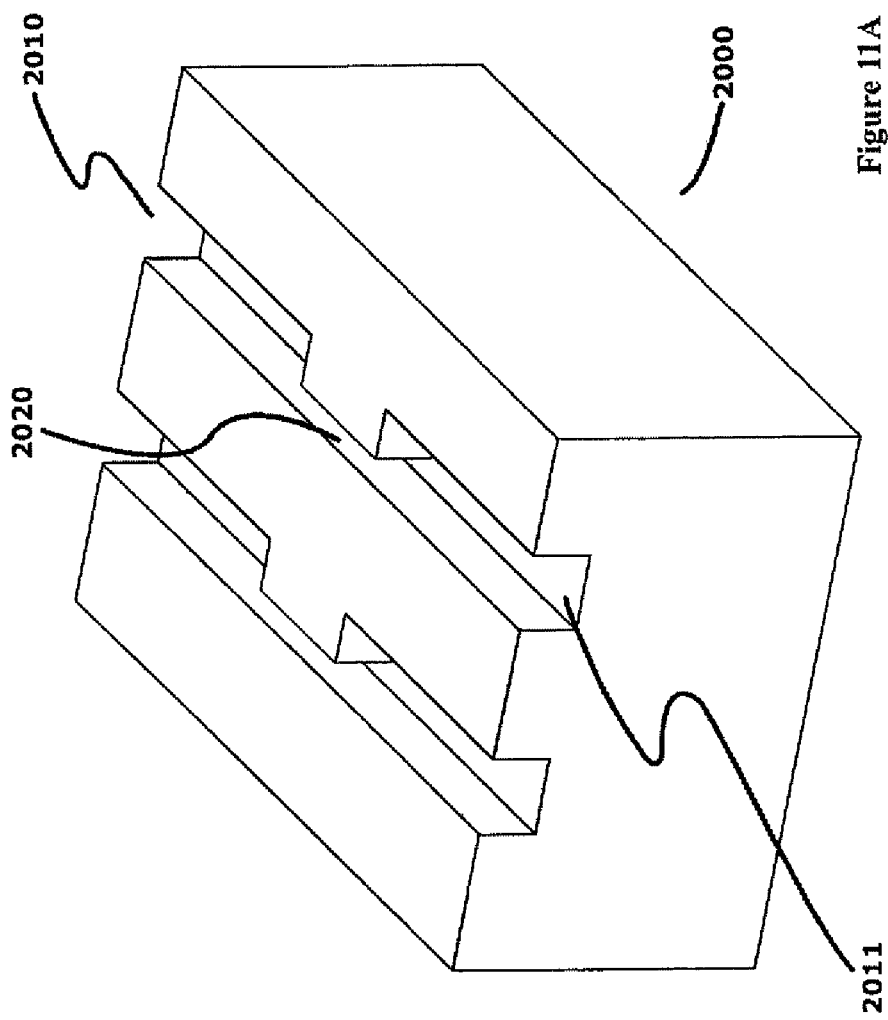
FIG. 11A is an exemplary perspective view of substrate used to prepare the present invention in the illustrative example.

A polycarbonate block was cut into sections. First and second slots 2010, 2011 (each approximately 0.325-inch-long×0.008-inch-deep×0.0393-inch-wide) were milled from the surface of the block 2000 as shown in FIG. 11 A. A channel 2020 (between 0.007" wide and 0.01" wide) was then cut intermediate the first and second slots 2010 and 2011, connecting the two larger slots in line. Each finished slot is used to hold a cell.

Cathode Preparation

A cathode sheet was prepared with a composition of 10% by weight of carbon black (e.g. ACE Black AB100 from Soltex, Houston, Tex., 83-85% by weight of fine electrolytic manganese dioxide (e.g. Tronox of Stamford, Conn.) and the balance (5-7%) by weight PTFE (e.g. 60 wt % dispersion of PTFE in water, available as TE3859 from Dupont Polymers (Wilmington, Del.)—has 60.6%>solids in batch, 5.7%>wetting agent) The sheet was prepared by combining the carbon black and manganese dioxide in a mixing container, and mixing at 1,000 RPM for 3 minutes in a Thinky mixer Model Number ARM-310 from Thinky of Laguna Hills, Calif. Then, roughly 1.05 grams of de-ionized water per gram of manganese dioxide was added to the mixing container, which was again mixed at 1,000 RPM for 3 minutes. Then, the PTFE was added, and mixed at 200 RPM in the mixer to disperse the PTFE, and then at 1,500 RPM to fibrillate the PTFE, forming a coherent mass.

The resulting coherent mass was then kneaded until the viscosity increases to the point where the material stiffness is increased and the material is formable. Pieces of battery packaging laminate consisting of a heat-resistant polymer outer layer, inner aluminum foil core, and heat-sealable polymer inner layer (e.g. packaging from Ultra Flex Corporation, Brooklyn, N.Y. The packaging consists of a 0.001" polyethylene heat-sealable layer on one side, a 48 gauge (0.0005") PET film on the other, and a 0.000316" aluminum foil layer in between the two) were cut, and folded lengthwise in half with the heat-resistant layer on the outside. Pieces of the coherent mass were broken off, and placed on the inside of the packaging folded lengthwise. The coherent mass was rolled down using a jeweler's mill; the material was periodically folded back on itself to enhance the fibrillation and bonding, and at times the material was rotated 90 degrees in position against the packaging to avoid its spilling out over the edge. Sheets of roughly 150 micron thickness were prepared in this manner from the cathode mix. This sheet was removed from the packaging material, placed on a weigh boat, and air-dried at room temperature for a few hours. Finally, the sheet was dried at 60° C. between a few hours and overnight.

Electrolyte Formulation

The electrolyte was first prepared using a mixture of 1.9 M NH4Cl and 0.63 M CaCl2 In deionized water.

A gelled electrolyte was then prepared, as follows: an amount of electrolyte was added to a beaker containing a stir bar. This beaker was covered to prevent evaporation, and heated and stirred on a stirring hot-plate until boiling. De-ionized water was then added to replace the water which had evaporated as determined by weighing. Sufficient agar was added to the beaker to produce a mixture containing 97% by weight of the electrolyte, and 3% by weight of agar. The electrolyte with agar was stirred on the hotplate until the agar dissolved, then de-ionized water was added to replace the water which had evaporated. The mixture was then stirred and allowed to cool to room temperature, forming a soft, cloudy gel.

Anode

Commercial pure zinc wire (e.g. (0.006" pure zinc 99.95% wire from California Fine Wire of Grover Beach, Calif.) was obtained.

Cathode-Current Collector Assembly Procedure

Strips of cathode material roughly 7 mm long were cut from a roughly 150μη thick piece of cathode material using a blade. Then, thinner strips up to 3 mm or so wide (but at least 600μη wide) were cut from these strips. Short lengths (roughly 2 cm to 10 cm) of 0.002 inch diameter titanium wire (e.g. 0.050 mm 99.8% pure, hard temper titanium wire from Goodfellow of Coraopolis, Pa.) were cut from a roll, and their ends were attached to a plastic weigh boat with a small dot of epoxy, which was allowed to cure. The assembly of the cathode is illustrated in FIG. 11B. The cathode strips 2040 were placed beneath the wire 2050 glued at one end 2051, and the wire was held taut over the strip. With the wire held taut, a conductive glue coating (e.g. prepared containing a polymeric binder and graphite flakes e.g. TIMCAL E-LB 1020, from Timcal of Westlake, Ohio). After the conductive coating was dried enough to hold the wire 2050 to the surface of the cathode sheet 2040, the end of the wire held taut was released. After the coating was dried in air for a few hours, the wire was cut away from one end 2051 of the assembly using a blade, the other end of the assembly was trimmed to a shorter length, and the cathode strip 2040 was cut to a width of between 400 and 800μη—see FIG. 11C.

Cell Assembly Procedure

Figure 11D:
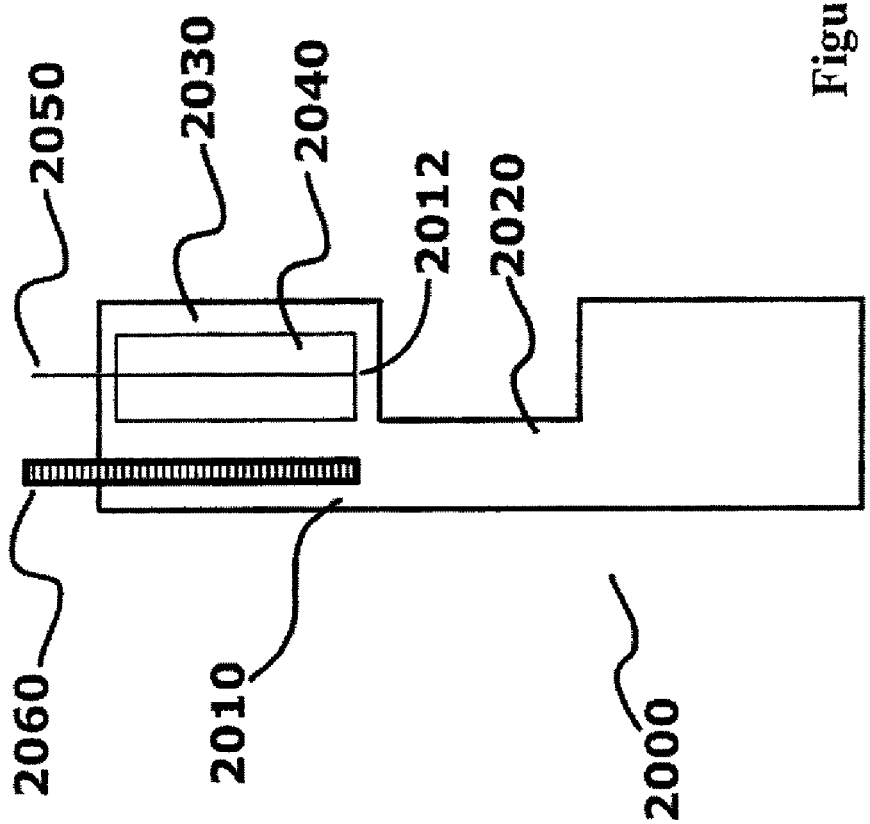
FIG. 11D is an exemplary perspective view of the present invention as prepared in the substrate as described in the illustrative example.

The cathode-current collector assembly was glued into the plastic substrate 2000 as shown in FIG. 11D using the conductive coating/glue. The cathode-current collector assembly 2030 was set in place with the wire facing down, to enable wetting the cathode strip 2040 later. The cathode-current collector assembly 2030 was first attached at the end 2012 of the slot 2010; the cathode-current collector assembly 2030 was then flexed away from the wall of the slot, additional conductive glue applied along the wall, and the cathode-current collector assembly 2030 pressed against the wall of the slot. If excess cathode material was present which would prevent clearance between the zinc wire 2060 inserted later and the cathode, the excess material was removed. Lengths of the zinc wire approximately 1.5 centimeters were cut and straightened. They were placed in the slot 2010 and extended out the open end of the cell; a small amount of epoxy was applied to hold the wire in place. Then, epoxy was applied across the channel opening of the slot, and polyimide tape (e.g. Kapton Brand) was placed over the opening of the slot until the epoxy had cured. At that point, the polyimide tape was removed. Then, electrolyte was applied to cover the slot, and allowed to soak into the cathode. An absorbent paper wipe was then used to remove all of the electrolyte from the slot and the area of the substrate surrounding the slot, except for that absorbed within the cathode. Gelled electrolyte was then added to fill the slot. A piece of polyimide adhesive tape (e.g. Kapton Brand) was placed over the top of the slot including the end; this tape would normally extend end-to-end with two cells vertically in place.

Then, two-part epoxy was used to cover over top of the polyimide tape, and also to cover the ends of the block where the wires exit the slot. Once the epoxy was cured, the polycarbonate substrate was secured. Then, smooth-jawed alligator clips were used to clip onto the wires (titanium and zinc) coming out of the cells, taking care not to short the cells. Insulator was placed between the clips to prevent them from touching. The insulators were removed after the epoxy had gelled, but before it was fully hardened. The cells were tested using ordinary battery test equipment.

Table 1 is the performance and general description of the electrochemical battery cell which was prepared as described in Example 1.

TABLE 1

| | |
|---|---|
| Capacity | 1.40 µA-h at 10 µA |
| Resistance | ~800-1500Ω(typical) at 100 µA |
| Cell dimensions (slot in substrate) | 0.325 inch long × 0.008 inch deep × 0.0393 inch wide (~0.03 inch wide)-roughly 8.3 mm × 200 µm × 1 mm (~1.7 µL) |
| Open Circuit Voltage | 1.5 V (nominal) |

Example 2

Zinc Powder Anode

An anode using zinc as a bound powder was prepared. Zinc powder (e.g. EEF grade from Umicore, Belgium) was prepared using PTFE (from TE3859 dispersion) as a binder, and using Acetylene Black (AB100%) as a conductive filler, with a composition of 5% acetylene black, 5% PTFE, and 90% zinc by weight. 20 grams of zinc were mixed by hand with 1.11 grams of acetylene black using a plastic spatula to form a visually homogeneous mixture. This mixture was then mixed using a Thinky ARM-310 mixer for three minutes at 1000 RPM with 9 grams of de-ionized water. Then, 1.85 grams of 60% PTFE (TE3859) dispersion were added to the mixture, which was mixed for three minutes at 200 RPM to disperse, then three minutes at 1000 RPM to fibrillate to form a coherent mass. This coherent mass was then kneaded and rolled between pieces of battery packaging (from Ultra Flex Corporation, Brooklyn, N.Y. The packaging consists of a 0.001" polyethylene heat-sealable layer on one side, a 48 gauge (0.0005") PET film on the other, and a 0.000316" aluminum foil layer in between the two). As with the cathode sheet preparation, pieces of this laminate were cut, and folded lengthwise in half with the heat-resistant layer on the outside. Pieces of the coherent mass were broken off, and placed on the inside of the packaging folded lengthwise. The coherent mass was rolled down using a jeweler's mill; the material was periodically folded back on itself to enhance the fibrillation and bonding, and at times the material was rotated 90 degrees in position against the packaging to avoid its spilling out over the edge. Sheets of roughly 150 micron thickness were prepared in this manner from the cathode mix. This sheet was removed from the packaging material, placed on a weigh boat, and air-dried at room temperature for a few hours. Finally, the sheet was dried at 60° C. between a few hours and overnight.

Strips of the anode material approximately 300 microns wide×150 microns thick×7-8 mm long were cut out, and then attached using the conductive glue (Timcal E-LB 1020) to 50 micron titanium wire current collectors (e.g. from Goodfellow, Coraopolis Pa.), as was done using for the cathode.

A cathode sheet consisting of 10 wt % acetylene black (AB 100), 5 wt % PTFE (from TE3859 dispersion), and 85% fine MnO2 (Tronox) was prepared as described in Example 1. Strips of material roughly 10 mm wide×150µm thick were cut from this sheet. Pieces of titanium foil were cut, and transparent tape was applied to leave an approximately 7 mm wide strip of bare foil. This foil was then painted over with conductive glue, and a strip of the cathode sheet was pressed in while the glue was still wet. After drying for roughly two hours to overnight at 60° C., the foil was removed from the oven, and cut into strips and inserted into an experimental holder; these strips with attached cathode acted as the counter-electrode. The experimental sample holder had a piece of zinc foil used as a quasi-reference electrode, the bound zinc sheet attached to the 50µ titanium wire acting as the working electrode, and the titanium foil with cathode sheet attached was the counter electrode. All three electrodes were together in a glass vial containing 1.9 M NH4Cl and 0.63M CaCl2 in de-ionized water electrolyte. A test was performed on three samples, consisting of alternating open-circuit periods of 30 seconds with pulses of 5, 10, and 100 µA applied to the working electrode, followed by an open-circuit period of 30 seconds. The internal resistance of each electrode was taken as the average of the resistance determined from the voltage drop at the beginning and end of the 100 µA pulse. The three samples had resistances of 101, 183, and 145Ω.

Example 3

Sealed Micro-Battery Construction
Forming Cell Components:

The cell components of the micro-battery assembled in this example are further described by the dimensions and other physical properties in Table 2.

TABLE 2

| | |
|---|---|
| Micro-battery dimensions | 10 mm in Length, 1.1 mm in width, 0.25 mm in thickness |
| Micro-battery volume | 2.75 cubic millimeters or 0.00275 cc |
| Anode dimensions | 7 mm in Length, 0.15 mm in width, 0.075 mm in thickness |
| Cathode dimensions | 7 mm in Length, 0.55 mm in width, 0.12 mm in thickness |
| Anode collector thickness | 0.03 mm in thickness |
| Cathode collector thickness | 0.03 mm in thickness |
| Electrolyte Volume | 0.000642 cc |
| Separator thickness | 0.030 mm |
| Packaging (each layer) thickness | 0.025 mm |

Preparing Cathode Sheet:

The cathode is prepared as follows. First, the dry powders are mixed using a Waring laboratory blender. MnO2 (Tronox fine) and BP2000 carbon black (Cabot) are mixed in a 500 g: 20.83 g ratio (24:1).

Once the powders have been blended, they are then transformed into a wet blend together with PTFE. The overall blend composition is 24.27% dry powders (as mentioned above), 66.50% de-ionized water, 4.86% Triton X-100 solution, and 4.37% solution (DISP30, 60 wt % PTFE). The wet blend is then filtered using a Buchner funnel under vacuum.

After the solid mass has been prepared, it is repeatedly rolled using a jeweler's press, pasta roller, or similar to fibrillate the PTFE chains further. After each rolling step except for the last, the solid mass is re-constituted to prepare for the next step.

A custom motorized roller setup is used to transform the dough into a freestanding sheet. The material is fed through the rollers a number of times, folding the material back onto itself each time, and the gap between the rolls is reduced until the gap is 0.12 mm. After this, the material is allowed to air-dry.

After the cathode is in the form of a freestanding sheet, this sheet is then attached to a current collector using an adhesive (such as EB-012 sold by Henkel, or E-LB 1020 sold by Imerys). The titanium foil current collector may be roughened by, for example, immersion in a boiling 10 weight % oxalic acid solution for ten minutes. After roughening, the titanium foil is removed, rinsed with de-ionized water, and allowed to dry thoroughly.

An Epilog FiberMark 50 W pulsed Ytterbium fiber laser is used to cut titanium foil (10 micron thickness) into strips which are 400μm wide. The strips of cathode material are cut to the desired width, and coated with EB-012 on one side. The coated side of the cathode material is pressed onto the cut titanium. Afterwards, the laser is used to cut the titanium and cathode into individual freestanding components.

An electrolyte gel is prepared consisting of 25 wt % zinc acetate, 0.2 wt % ammonium acetate with the balance water, gelled with 6 wt % CMC (GA07 Walocel).

If desired, the cathode strip may be laminated to a separator. To accomplish this, a cathode strip on titanium is coated with electrolyte get and a piece of separator (25 μm thick Dreamweaver Silver™, available from Dreamweaver International, Greer, S.C.) slightly wider than the cathode is placed on top of the gelled electrolyte. The cathode and separator are placed between two pieces of FEP (fluorinated ethylene propylene) film, and the entire stack is then placed between two" thick brass shim pieces. The stack is then run through an Apache AL-13P laminating machine so that the cathode and separator are mechanically bonded together.

The anode consists of a piece of zinc foil which is cut to size using a technique such as laser or ultrasonic cutting. Optionally, the zinc may be glued to a piece of roughened titanium foil using a conductive adhesive prior to cutting; the roughened titanium foil serves as the current collector for the anode. The glue used may be a carbon-filled thermoset resin such as Atom Adhesives AA-Carb 61. In the case where a thermoset resin is used, it is applied to either the zinc or the titanium. It is also possible to apply a thermoplastic resin paste, ink, or coating, such as Creative Materials (Ayer, Mass.) 107-25, to one side of a zinc strip and a titanium piece, and then to apply heat and pressure to join the two together.

In some cases, it is desirable to have two cells in series sharing a current collector, which acts as the anode current collector for the first cell and the cathode current collector for the second cell. In this case, the anode is attached to one part of the current collector as described above while the cathode is attached to the other side of the current collector, allowing bare current collector on either end to enable feedthroughs.

Coated Film:

Coated packaging film refers to a polymeric film adjacent to a film with a higher barrier than that of the polymeric material, and where the said higher barrier film is formed on the polymeric film or resides on an adjacent layer. The ceramic film may be silicon oxide, aluminum oxide, titanium oxide, aluminum, gold, titanium, or the like, and the film may be formed by CVD, sputtering, plasma deposition, sol-gel, and the like. Optionally, the coated film may include alternating layers of polymer and higher barrier film deposited onto the initial higher barrier film. A preferred example of the packaging film used is Ceramis CPP-004 (CelPlast, Toronto, Canada), which is polypropylene coated with a silicon oxide barrier layer.

Packaging the Cell:

In general, the cell is normally sealed between two pieces of polymer film, either coated or uncoated, which form the top and bottom of the packaged cell. The first step in manufacturing the cell is to lay down the cathode and cathode collector onto the package, so that the cathode collector is in place on the package. It is helpful to mechanically hold the cell components in place during sealing, so that they do not shift to cause a short or interfere with the sealing process. For example, it is possible to attach the cell components to one of the packaging films using a lightly tacky pressure sensitive film, such as 3M 80 spray adhesive or Krylon Easy-Tack. One may also envision using a mechanical clamp of some fashion to hold the cell components in place during the sealing process. Once the cathode and collector are in place, the cathode is wetted with electrolyte. The cathode may optionally be laminated to a separator prior to cutting; if this is not the case, a piece of separator is mechanically placed on top of the wet cathode, and if necessary more electrolyte is applied.

At this point, the anode, (and optionally the anode collector; the combination may be referred to as the anode assembly) is then added to the cell. If the cathode is not laminated to a separator as described above, the anode assembly may be placed beside the cathode, and separated from the cathode by the separator to prevent electrical shorting. Alternatively, whether or not the cathode is laminated to a separator, the anode assembly may be placed on top of the cathode and separator. In either case, it is preferable for the separator to be wider than the cathode (or, in the case where the cathode is laminated to the separator, equal in width to the cathode), and for the anode assembly to be narrower than the cathode. Once the anode, cathode, and separator are in place, the cell is ready to be sealed, together with the top layer of packaging.

The cell package has two kinds of seals—"feedthroughs," and "sides." Feedthroughs are located on the shorter axes of the cell, while sides are located on the longer axes of the cell (where said axes may be linear, arcuate, or some other shape.) The functional difference between feedthroughs and sides is that sides only need to act as a hermetic seal, while feedthroughs need to act as a hermetic seal and also enable an electrical terminal or terminals to extend through them. If the shorter axis of the cell is very small (for example less than 1.5 mm wide but generally greater than 300 microns wide), sides need to be much narrower than feedthroughs to prevent an unacceptable internal volume loss. In general, the sides may be between 20μm wide and 200μm wide, dependent on the length of the shorter cell axis. At the same time, it is possible to add material to the thickness of the feedthrough (such as a dry film, coating, or adhesive) to ensure that the feedthrough is hermetic even though it has to go around the current collectors. It is acceptable to have the feedthrough seal occupy a greater length, because of its location on the longer axis of the cell which is generally at least 4 mm long.

Positioning of the electrodes relative to the seams is critical when dealing with such small components. In general, the position of the side seams and electrodes may be within 5% of the width of the battery. For example, for a 1 mm wide battery electrode and side seam positions would have a tolerance of less than about ±0.05 mm. For the length of the battery, the tolerance of the position of the bare part of the terminal which goes through the feedthrough, the feedthrough adhesive, and the feedthrough sealing mechanism may have a tolerance of roughly 25%. For example, for a 1 mm wide seal the positioning may be within ±0.25 mm. Note that the width of the bare terminal (the cathode collector which is not coated with cathode material, and the anode collector which is not covered by the anode) may extend the length of the feedthrough seam.

Thus, different sealing methods are needed for the sides and the feedthroughs. For sealing of the sides, ultrasonic welding is preferred. Prior art ultrasonic welding of plastics takes place with the motion of the ultrasonic horn largely perpendicular to the vector of the seal, and this results in a wide joint which is objectionable. If the oscillation motion of the ultrasonic horn is predominantly in the same plane as the packaging material, a relatively narrower seal may be achieved.

Alternatively, laser welding has been used to produce a seal width of under 40μη.

After welding the side seams, it is necessary to cut through the packaging film around the sides in order to separate out the battery package. In some cases, it is possible to simultaneously weld and cut the side seams. For example, it is possible to simultaneously seal and cut plastic films with a seal width of under 50μη using ultrasonic welding when the direction of the vibration is nearly parallel with the plane of the packaging material. The vector created by the direction of sealing, which in the case of the side seal is along the length of the battery package. However, in certain cases it may be preferable to seal the side seams in a first step, and then use another step to remove the packaged cell from the packaging film. This second step may utilize waterjet cutting, ultrasonic cutting, laser-cutting, tool-die degating, or the like.

For the feedthrough, it is necessary to completely close off the package around the current collector that extend through the packaging. Because the active materials do not extend into the feedthrough area, it is possible to add appreciable thickness to the packaging within this area. For example, for a cell which is 250 microns thick with 25 micron packaging, roughly 200 microns of material may be added to the feedthrough area to enhance sealing.

A first alternative is to coat the current collectors and/or the packaging with a polymer latex, such as Dow Hypod, Mitsui Chemipearl, Aquaseal X 2088, or Joncryl prior to heat sealing. Another alternative is to add a dry polymer film, such as is manufactured by Fastel, to the seal area. A heat sealable polymer may also be applied (for example, by screen printing) to the inner surface of the packaging as a dispersion. Yet another alternative is to apply a tacky film, such as Asphalt, Conseal 1400 (Fujifilm Hunt), or Henkel PM040 to the packaging and/or current collectors in the feedthrough area to enhance heat-sealing, or apply a curable thermoset adhesive, such as a two-part adhesive, a heat-cured adhesive, or a UV-cured adhesive, in the feedthrough area. For some embodiments, it may be necessary to cut through the adhesive for the feedthrough while welding the sides; this may be accomplished by ultrasonic welding, which is known to remove contamination from the weld area. This is because it is necessary for the feedthrough seal to seal around the terminals of the cell, without any gaps.

In some cases, the feedthrough adhesive (polymer latex, heat seal film, tacky film, or thermoset adhesive) may be applied before the pressure sensitive adhesive described above, and in some cases it may be applied after, depending on the properties of the heat seal adhesive. In the case of using a curable adhesive, once the heat seal adhesive is in place, the sides of the cell may be sealed using a technique such as ultrasonic welding or laser welding using a fixture to substantially exclude electrolyte from the side seal, followed by curing the adhesive in place to create the feedthrough.

Example 4

To reduce the ingress of water into or out of the cell, the osmotic pressure difference between the cell and its surroundings may be reduced. The osmotic pressure may be approximated using the Morse Equation, $P=\Sigma inMnRT$, where P is the osmotic pressure, T is the absolute temperature, R is the ideal gas constant, Mn is the concentration in moles per liter of the nth component of the mixture, and in is the number of ions per formula unit obtained upon dissolution of the nth component of the mixture. The difference in osmotic pressure between two solutions may be expressed as the difference in P, as defined above. Preferably, this difference may be less than 25 atmospheres, or more preferably less than 11 atmospheres.

We prepared an electrolyte solution of 25 wt % zinc acetate and 0.2 wt % ammonium acetate with the balance comprising de-ionized water (referred to as the "stock solution"). We also produced two diluted electrolyte solution which may be referred to as the 6.25% zinc acetate solution (1:3 ratio from stock solution) and 1.8% zinc acetate solution (1:13 ratio from stock solution). The solution which the battery is stored in proximity to is a saline solution with a composition of 0.824% sodium chloride, 0.893%) boric acid, 0.23% sodium borate, and 0.01% sodium ethylenediamine tetraacetate (EDTA) by weight, with the balance comprising de-ionized water; this may henceforth be referred to as "packing solution." An additional electrolyte was made comprising 0.822% sodium chloride, 1.463% boric acid, and 0.011% sodium borate by weight, which may henceforth be referred to as "modified packing solution." The osmotic pressure relative to the packing solution as calculated using the Morse Equation is given below in Table 4.

Test Results for Different Solutions

Cells were prepared to establish performance of the various electrolytes. Each cell used a piece of card stock as a backing to provide stiffness, and the packaging consisted of a 0.001" polyethylene heat-sealable layer on one side, a 48 gauge (0.0005") PET film on the other, and a 0.000316" aluminum foil layer in between the two (Ultra Flex Corporation, Brooklyn, N.Y.). To enable heat sealing of the battery, pieces of dry heat sealable polymer film (Fastel Adhesives & Substrate Products) were used, with a window of 9 mm×1 mm cut out of one piece within the cell to hold the battery components. The anode was cut out of 0.075 mm thick zinc using an Epilog Fibermark laser; said anode was comprised of a strip which was 0.25 microns wide. The cathode was prepared as described earlier with a composition of 85% MnO2, 10% carbon black, and 5% PTFE by weight. The cathode was laminated to a cut titanium piece as described above. For these tests, the cathode was 400μη±5% wide× 130μη±5% thick×8.5 mm±0.5 mm long. The anode and cathode were placed into the window in the dry heat sealable film such that they were not in physical contact with each other.

To fill the cells, electrolyte was added to wet the cathode. Gelled electrolytes prepared by mixing the electrolytes above with between 1.8 and 5% by weight Walocel GA07 (Dow Chemical Company) were added to fill the window within the dry film, and the cell was packaged using heat sealing, with packaging film on both sides of the cell. The cells were tested using a VMP3 (Bio-Logic) with a test protocol of a 20 μA constant current discharge down to a cutoff voltage of 0.9V. The internal resistance was measured as the voltage drop obtained from an initial 20 μA pulse lasting three seconds prior to discharging the battery.

In addition to electrochemical data, gassing data were obtained to semi-quantitatively establish projected shelf life in the various electrolytes. Gassing was obtained by cutting 0.075 mm thick zinc into 0.13 mm wide strips using an Epilog Fibermark laser, which were added to glassware designed to obtain gassing rates. This glassware consists of a volumetric flask filled with electrolyte solution, which is in contact with the zinc strips. This flask is sealed with a wax-coated glass stopper. A graduated section is attached and open to the neck of the volumetric flask, with an opening exposed to ambient atmosphere; when hydrogen gas is evolved it collects below the wax-filled section, which forces electrolyte up into the graduated section, allowing the gassing rate to be determined by measuring the position of the electrolyte in the graduated section at different times. The wide portion of the flask was held in a heated bath held at 45° C., and the gassing rate was determined based on the rise in electrolyte in the graduated section. Because zinc corrosion is one of the major factors impacting shelf life in carbon-zinc batteries, the gassing rate may be taken as a proxy for shelf life assuming that zinc corrosion is the main factor limiting shelf life. Data is summarized in Table 3 below. As the cathode is the electrode limiting capacity, data are normalized volumetrically to a cathode size of 400μη×8 mm×130μη. Each data point is the average of ten cells tested. Notably, for those solutions containing zinc acetate the pH increases with decreasing concentration, while gassing rate decreases, and a substantial capacity is retained. Furthermore, gassing is low in packing solution and modified packing solution, even in the absence of zinc.

TABLE 3

| Electrolyte | pH | Open-circuit voltage | Resistance, Ω | Osmotic pressure, atmospheres | Capacity, μA-h | Gassing rate, mL/g-day |
|---|---|---|---|---|---|---|
| Stock solution | 5.94 | 1.530 | 1080 | 75 | 180 | 0.798 |
| 6.25% Zinc acetate solution | 6.27 | 1.518 | 1312 | 10 | 160 | 0.521 |
| 1.8% Zinc Acetate Solution | 6.79 | 1.511 | 2431 | −5.0 | 90 | 0.500 |
| Packing Solution | 7.52 | 1.419 | 5040 | 0 | 80 | 0.158 |
| Modified Packing Solution | 6.04 | 1.513 | 2840 | 1.8 | 120 | 0.189 |

Exemplary Component Compositions

A wide variety of compositions may be used in the electrochemical battery cell. Any combination of components would be selected for electrochemical compatibility, and for the ultimate use of the electrochemical cell. For example if biocompatibility is required, components would be thus selected.

Approval of medical devices by regulatory agencies require that a biocompatibility assessment be conducted to assure safety of the device or material Biocompatibility classification is thus obtained by testing according to certain guidelines, including ISO 0.10993, "Biological Evaluation of Medical Devices," and the japan Ministry of Health, Labour and Welfare (MHLW) 'Testing Methods to Evaluate Biological Safety of Medical Devices," Notice from the Office Medical Devices. The testing of the biocompatibility of a device is intended to demonstrate that the device may not, either directly or through the release of its material] constituents: (i) produce adverse local or systemic effects; (ii) be carcinogenic; or (iii) produce adverse reproductive and developmental effects. Some materials have been well characterized chemically and physically in the published literature and in the marketplace and have a long history of safe use. Such materials may be considered biocompatible and are thus preferred. Materials that are used in medical device batteries may affect a human eye by touch, leak from the battery due to, for example, an accident or an improper sealing of the battery. Use of biocompatible materials minimizes any risk of such complications occurring if the leaking or leached materials make contact with the eye or other human tissues.

The anode is the electrode component which is oxidized in the electrochemical battery reaction. In one embodiment, the anode comprises zinc as the active component in the form of a contiguous wire or thin cylinder. The zinc is preferably battery grade in that it is free from impurities generally understood by those skilled in the art to promote corrosion and other undesirable side reactions in the battery. The zinc may also be alloyed with alloys such as bismuth, indium, calcium, or aluminum to increase shelf life. Lead in small amounts has also been shown to be an effective zinc alloy material. Although thought of as non-biocompatible, the lead stays within the zinc grain boundaries and is not dissolved in the electrolyte. Thus, such added lead may not create a biocompatibility issue. The anode wire also acts to collect the electrons flowing from the anode and transport them out of the electrochemical battery cell. To accomplish this dual role, excess anode is preferably added to the battery to ensure the anode remains contiguous. Zinc powder may be used as an alternative anode material as is shown in Example 2.

The cathode is the electrode component which is reduced in the electrochemical battery reaction, and when the electrochemical battery cell is placed in a circuit with a load, the cathode attracts electrons from the circuit. The preferred cathode material may be manganese dioxide which is mixed with a conductor additive and binder to form a cathode mix. It may be preferable to include as much manganese dioxide in the cathode mix to maximize the capacity of the electrochemical battery cell and to reduce the necessary size of the cathode. The amount of cathode in the electrochemical battery cell is determined relative the anode and its active amount. The molar amounts of each the anode and cathode are determined so that the cell reaction may be accomplished for the desired duration. The form of the cathode is planar in one embodiment, but may be cylindrical in an alternative embodiment. The cylindrical cathode may be extruded or otherwise shaped while being formed.

The conductor is used to enable electron flow between cathode particles and from and to the cathode current collector. The amount of conductor is preferably minimized to accomplish this task as there is little benefit to adding excess conductor. Conductors appropriate are graphite, expanded graphite, acetylene black, carbon black, and other conductors known by those skilled in the art. Preferably acetylene black is used in the present invention as it provides the cathode mix a desired level of electrolyte absorptivity.

Binder is used in the cathode mix to provide structure to the cathode throughout the electrochemical battery cell life. The binders ability to provide this structure may not be altered by the electrolyte or by the expansion of the manganese dioxide. Preferred binders include particulate Teflon® (PTFE) emulsion which may be fibrillated during mixing of the cathode mix.

The cathode mix electrically communicates with the cathode collector, and the purpose of the cathode collector is to both electrically communicate electrons to and from the cathode but to also provide structure to the electrochemical battery cell. A titanium wire is the preferred structure for the cathode collector as it adequately conducts and has the required rigidity in small diameters. Titanium mesh, titanium ribbon, expanded mesh, braided wire all are alternative cathode collector materials.

Electrolyte is selected for compatibility with the reactive electrode materials. For the zinc anode and a manganese dioxide cathode, a LeClanche electrolyte, or ammonium chloride NH4Cl solution, zinc chloride ZnCl, zinc acetate and mixture thereof, are one embodiment. For dilute solutions, acetate electrolytes, which contain zinc acetate and optionally other acetates such as ammonium acetates, are preferred due to zinc chloride's solubility behavior. Salines, such as sodium chloride NaCl, magnesium chloride MgCl2 and potassium chloride KCl solutions together with additives such as sodium borate, boric acid and sodium ethylenediamine tetraacetate may alternatively be used. For the gelled electrolyte, carboxymethyl cellulose, agar, or an alternative gelling agent may be used. The gelling agent is to increase the viscosity of the electrolyte so that it remains within the cell at a location where it is useful, namely between the anode and cathode.

The gelled electrolyte may be located throughout the cell interior of the electrochemical battery cell, and is most preferably located between the anode and cathode which are disposed relative each other by a predetermined distance. This predetermined distance may be calculated by those skilled in the art, but the distance may allow for tolerances necessary to prevent short circuits caused by the anode and cathode coming in contact with each other. As there is no separator or other physical barrier between the electrodes, a practical distance is necessary in this embodiment. The gelled electrolyte viscosity does act to hinder movement of the electrodes and its placement between the electrodes both acts to enable ionic communication and to prevent movement of the electrodes towards each other. The gelled electrolyte may also enhance biocompatibility, by providing a physical barrier around the electrodes. Particles moving from the electrodes are caught in the gelled electrolyte and prevented from moving away from the electrochemical battery cell or towards the other electrode. In another embodiment a thin barrier may be placed between the anode and cathode to prevent relative contact. The thin barrier may be made of a separator material or an ionically conductive and electronically insulating material.

An anode tab may be mechanically connected to the anode so that it may electrically transport created electrons from the anode to the negative terminal of the electrochemical battery cell. Using an extension of zinc wire for this purpose may corrode or otherwise affect biocompatibility. Therefore titanium or other corrosive resistive conductive materials are appropriate to extend the anode through any packaging material to provide the required external electron conduit.

The electrochemical battery cell may be enclosed in a packaging material to enclose the cell components to enhance shelf life, restrict ionic, oxygen, and water migration into and out of the cell, and to ensure biocompatibility. As the packaging material is inert and plays no role in the performance of the battery, minimizing the thickness and amount of the material is preferred. A material that is inert and does not interfere with the cell reactions is also preferred as is a material that is easily formed into a contiguous exterior around the entire electrochemical battery cell while enabling sealing of the terminal electrodes which necessarily penetrate the packaging and protrude from the packaging. The packaging material is also preferably easily formed and sealed by high speed manufacturing processes. Pigmentation of the packaging material may also be desired and this requirement may inform the packing material selection.

Polypropylene may be preferred as a packaging material in that it may be easily weldable via a variety of processes including heat, ultrasonic and laser welding. In addition, polypropylene may be adhesive—bondable and available in a variety of thicknesses and densities. In addition, polypropylene may be impervious to the preferred electrolyte compositions and may contribute to biocompatibility. Alternative biocompatible polymers such as polyurethane, polyvinylpyrrolidone, silicone elastomers, polyethylene, polytetrafluoro ethylene, poly-(p-phenyleneterephthalamide), polyvinyl chloride, polypropylene, polyolefins, polyesters, polyacrylates (including polymethacrylates).

The battery exterior or the exterior surface of the packaging material may also be coated to further render it biocompatible. Appropriate biocompatible coatings may include phosphorylcholine and poly-para-xylylenes, such as paralene C.

The coated film used as a packaging material may serve at least two barrier functions, in addition to acting to maintaining the physical integrity of the battery. The film may prevent migration of salt ions, to prevent the loss of electrolyte ions in the event that the battery is surrounded by liquid. The film may also retard water transport, to prevent swelling of the battery. For the case where the battery is enclosed in a sealed package prior to use, the prevention of oxygen transport is not a critical need; however, those skilled in the art will recognize that the same sorts of coatings used to retard moisture transport may also substantially retard oxygen transport.

Within the packaging industry, permeability to water of a material or device is normally measured by subjecting one side of a barrier film to a given relative humidity while keeping the other side dry, for example by purging with dry gas, while maintaining a constant temperature, and measuring the water transmitted across the film from the side with controlled relative humidity to the dry side expressed in terms of water vapor transmission rate (WVTR), with units of mass/area*time at a given temperature and relative humidity. For example, the units may be expressed as g/m2-day at temperature in degrees Celsius and relative humidity.

For the preferred embodiment, the WVTR of the packaging may be less than 1 g/m2-day, or more preferably less than 0.1 g/m2-day, or still more preferably less than 0.02 g/m2-day, where said WVTR is measured at between 85 and 100% Relative Humidity and between 20° C. and 40° C. Instruments for performing such tests are available from, for example, MOCON Inc. (Minneapolis, Minn.)

It may be noted, however, that conventional WVTR measurements may only measure moisture transport normal to the barrier film, i.e. through whatever barrier coating may be present. Given a sealed package, however, it is possible for moisture to transport through the seam, i.e. parallel to the plane of the barrier film. This may be especially relevant where the seam of the package is particularly narrow, for example less than 100 microns wide. Thus, the barrier property of the polymer film itself, rather than the coating, dominates the transport behavior of the side seam, which may make a nontrivial contribution to overall moisture transport into and out of the battery particularly for very small batteries, for example those with a package having a surface area of 0.5 cm2 or less. Therefore, it is preferable for the WVTR of the polymer to be less than 10 g/m2-day, or more preferably less than 5 g/m2-day at a thickness of 25 microns, a temperature between 20° C. and 40° C., and a relative humidity between 85 and 100%.

Sealing methods for the packaging material include the described ultrasonic and laser beam welding. Alternative sealing methods include heat welding and the use of biocompatible adhesives.

Additional Electrolyte Formulations

In some examples, an improvement in gassing of microbatteries may be obtained by using more highly purified chemicals (substituting 99.99% pure zinc acetate for 98% pure zinc acetate in our electrolyte formulation.) Additional improvements may be obtained by adding zinc chloride to a zinc acetate based electrolyte which may also increase battery capacity significantly. In some examples, this may be because of the enhanced utilization of water and/or the reduced water content in the discharge products when zinc chloride is incorporated into the electrolyte.

Polymer Package Mechanical Integrity

In some examples, a dry polymer film adhesive may provide a reproducible, mechanically strong bond with convenient manufacturing. In some examples, further improvement may be obtained by using a heat sealable tape, comprised of polypropylene or modified polypropylene on both sides of a polyester core. Such materials may be applied in place of dry heat sealable polymer film. In some examples a tape used to adhere terminals of lithium-ion batteries to polypropylene heat sealable packaging, available from Targray may be used. This tape may provide a reproducible, strong mechanical bond between the current collectors and the polypropylene film packaging.

An alternative dry heat sealable tape example may include a tape intended for adhering lithium ion battery terminals to polypropylene packaging. This tape may be obtained from MTI, For each of the exemplary heat sealable tapes, it may be possible to ultrasonically seal the sides of the package through the tape prior to heat sealing the terminals, such that the sides of the cell were joined together including in the region with the heat sealable tape.

The bond between the heat sealable tape and the packaging film may be improved by adjusting conditions for etching of the titanium used in the electrode contacts. In some examples, it may be useful to etch titanium by immersing it for ten minutes in a boiling solution of 10 weight percent oxalic acid in water. In some other examples, two additional protocols for etching—a hydrofluoric acid based etch, and a hydrogen peroxide based etch; may provide enhanced adhesion of titanium to polypropylene. In some examples, improvement in bonding may be determined by a burst test (weight was placed on a heat sealed polypropylene package with one of the sides having a piece of the etched titanium with the aforementioned heat sealable tape positioned on both sides of the titanium between the titanium and the plastic packaging).

In some examples, Titanium foil may be cleaned by wiping its surface with isopropanol. The resulting cleaned foil may then be placed onto a series of plastic rods on a perforated substrate. The foil may be immersed in a pickling solution containing 35 g/L 40 wt % hydrofluoric acid, 23.6 g/L sodium sulfate, and 350 g/L concentrated nitric acid, with the balance water. Subsequently, the titanium may be rinsed with tap water. Then, the etched titanium may be placed in a phosphate conversion bath comprised of 53 g/L trisodium phosphate, 21 g/L potassium fluoride, and 32 g/L 40% hydrofluoric acid solution for approximately two minutes for example. The titanium may then be rinsed and placed in a vessel filled with de-ionized water in a water bath held at 65° C. for a time period such as fifteen minutes. The titanium may then be removed from the bath and dried in a drying oven prior to use.

In some examples, a hydrogen peroxide based etch may be performed with a modified RAE etch$^i$. The chemical composition of the etch formulations may be varied, for example where etching solutions may be formed with 2% by weight sodium hydroxide, and 1%, 2%, or 3% by weight of hydrogen peroxide, with the balance de-ionized water. Subsequently, the solution may next be held in a beaker in a water bath maintained at 60° C. Titanium foil may next be wiped with isopropanol for cleaning, and then racked onto a series of plastic rods on a perforated substrate. The foil may then be etched in one of the solutions for 5-20 minutes, then removed and rinsed with de-ionized water. The cleaned foil may next be allowed to dry in an oven.

Superior bonding conditions may be observed by electrochemical testing performed by holding a sample of cleaned/etched titanium foil at 1.55V against a piece of zinc foil in an electrolyte solution including approximately 6.25% zinc acetate, 0.5% ammonium acetate, and 10 ppm $In^{3+}$ added as indium sulfate.) It may be noted that the titanium etched with 1% hydrogen peroxide as described may draw significantly less current than unetched titanium. This may perhaps be due to a formation of an oxide layer on the titanium surface during the hydrogen peroxide etch, which may be called anodization.

In some examples, a titanium current collector may be modified in the region where it is heat sealed resulting in improvements of the mechanical integrity of the heat seal. In some examples, the improvement may enables staking of heat seal tape through the battery, reinforcing it. In some examples, the results of modification by cutting holes in the terminus of the electrodes may be tested by manually pressing on packaged cells near the cathode terminal using a metal poking tool. In some examples, qualitatively improved strength may be observed for cells with two types of perforated cathode titanium current collectors than with unperforated titanium cathode current collectors. The cells with the perforated current collectors remained intact, while the cells with the unperforated current collectors leaked electrolyte when pressed. This may imply that the mechanical integrity of a battery cell package may be enhanced by the perforation, which may lead to increased shelf life.

Filling and Sealing Methods

As mentioned previously, one may use ultrasonic welding to exclude electrolyte from a side seal. Also noted was the possibility of using laser welding with an appropriate fixture to accomplish a similar result. In some configurations, however, the use of ultrasonic welding to seal a wet cell (a cell with electrolyte present) may be problematic. The cell may not be able to seal completely. Perhaps this may be because of an interaction of the ultrasonic energy from the horn with the electrolyte within a small, enclosed space creating localized pressure variations which may damage the seal, particularly around the terminals.

In some examples, improvement may be achieved by changing from a one-stage weld to a two-stage weld. In such an example, where the majority of the cell perimeter was welded for a dry cell using heat seals for the ends and an ultrasonic seal on the perimeter, the cell was filled, and then the remaining small open portion of the cell perimeter was sealed ultrasonically. Then the cell may be degated, and the leads cleared of excess plastic flow from heat sealing using a small knife.

Use of Adhesives to Hold Components in Alignment

In some examples, it may be helpful to temporarily hold components in place, so that they do not move out of alignment in subsequent steps. While mechanical clamping may be a solution, this may have an issue in that it requires gripping in multiple locations, and requires special fixturing for each step. In some examples, a solution may involve using pressure sensitive adhesives, such as 3M 75 to hold components in place. In some examples, using a mixture of 0.5 wt % sodium carboxymethylcellulose (Walocel 2000 GA 07, Dow) may help to ensure that the cathode, separator, and anode are aligned with each other when stacked, while still enabling electrolyte conduction.

In some examples, the solution may also include using very small dots of nonconductive pressure sensitive adhesive (3M 75) between layers. The adhesives may be applied by any number of conventional methods, such as brushing or spraying as an aerosol (for example, using a preformulated aerosol can or using a conventional airbrush), with the use of a template or stencil if necessary.

Improved Package Barrier Strength and Mechanical Strength Through Electroless Plating In some examples, a narrow side seam in the battery package may create a region with poor barrier properties, enabling the transport of moisture and gaseous species into and out of the cell. Conventional batteries packaged in laminates ("pouch cells") may have much wider seams on all sides. For example, the side seal of a pouch cell may be larger than the entire width of a micro-battery (2-4 mm per side, vs under ~1 mm width for a micro-battery). The wider seams, which may not be possible to incorporate in a small micro-battery, may act as an effective moisture and gas barrier due to width. Thus, an alternative solution is needed for barrier strength with very narrow seams.

In some examples, a solution may involve overcoating the micro-batteries with a conformal barrier layer using electroless plating. There may be a range of techniques available for creating a conformal hermetic barrier coating. Overcoating a miniaturized carbon-zinc batteries, however, may present special challenges. The presence of moisture within the battery electrolyte combined with the imperfect barrier properties of the package may mean that there may be a continual flux of moisture through the packaging to the surface of the battery. This flux may act to contaminate the surface. Furthermore, the imperfect packaging may enable outflow of moisture. Furthermore, limits may be imposed by the melting point of the plastic packaging (roughly 160° C. for polypropylene) which may limit the temperate possible for any coating method.

Vacuum techniques such as sputter deposition and thermal evaporation which require a clean surface for deposition may also be inferior for overcoating micro-batteries due to the continual flux of moisture to the surface. And, atomic layer deposition may be unsuitable for the same reason. Other techniques such as sol gel coating and chemical vapor deposition may require exposure to temperatures which may damage the battery.

In some examples, a desirable solution for improving barrier effectiveness and mechanical strength may involve electroless plating as a technique for creating a conformal barrier coating. Electroless plating is a conventional technique, which can deposit a conformal metal layer onto a conducting or nonconductive coating. Electroless plating baths have been developed for depositing metals such as nickel, copper, and tin onto plastic surfaces. The electroless plated metal may then be further plated using electroless plating or electroplating with a wide variety of metals, including nickel, copper, tin, gold, silver, cadmium, and rhodium. In some cases, because of cost, corrosion, and/or mechanical concerns, it may be desirable to use a layered structure incorporating more than one electroplate layer.

The coating may be made arbitrarily thick, and may mechanically reinforce the battery in addition to acting as a barrier. This mechanical reinforcement may force hydrogen out the sides of the cell, reducing or eliminating bulging due to hydrogen gas generation during zinc corrosion. To avoid the creation of a short circuit between the battery terminals due to plating, it may be necessary to mask one or both terminals using a nonconductive material during the plating process.

In some examples a layer may be formed with electroless plating where electroless plating and/or electroplating may be used to create a roughly 1 mil (25 microns) conformal copper coating on them. Platers' tape may be used to mask both terminals of these batteries during plating to avoid short circuiting the batteries during the plating processing.

The tape may next be removed from the terminals, and then the batteries may be aged at room temperature at 50% relative humidity. In order to make a comparison similar cells which had not been copper plated were aged under the same conditions. The cells were intermittently monitored by having their open-circuit voltage measured and their resistance established by passing three pulses of 20 µA for 100 milliseconds. The cells may be deemed to have failed when their resistance was over 20 kΩ, as compared to under 5 kΩ for a fresh cell. The electroless plated cells may show significant improvement in lifetime over comparison non-plated cells.

Anode Reinforcement:

In some examples, it may be observed that when sealing micro-battery cells, the anode can bend, resulting in corrosion. To remedy this, In some examples the anode may be reinforced by bonding it to titanium foil using a conventional epoxy (JB-Weld plastic adhesive.)

What is claimed is:

1. A method of manufacturing a micro-battery comprising:
   obtaining a cathode collector;
   attaching a cathode to the cathode collector with a conductive adhesive;
   obtaining an anode collector;
   obtaining an anode;
   stacking the cathode collector, the cathode, the anode, the anode collector, and a separator, wherein the separator lies between the cathode and the anode;
   surrounding the stack with a first and second flexible plastic sheet;
   welding the first and second flexible plastic sheets to each other with a first ultrasonic weld, wherein the first ultrasonic weld surrounds the stack along a first portion of two sides, wherein a second portion of the two sides comprises a fill port for the micro-battery;
   filling an electrolyte within the fill port;
   applying a second ultrasonic weld, wherein the second ultrasonic weld seals the second portion of the two sides of the first and second flexible plastic sheets and seals the fill port;
   depositing an electroless plated layer of copper along a portion of the micro-battery.

2. The method of claim 1 wherein ultrasonic motion applied during at least one of the first ultrasonic weld and the second ultrasonic welds occurs predominantly along the same plane as the surface being sealed.

* * * * *